United States Patent
Dimou et al.

(10) Patent No.: US 12,418,383 B2
(45) Date of Patent: Sep. 16, 2025

(54) MEASUREMENT REPORTING FOR FAST FADING DETECTION ERROR

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/161,020

(22) Filed: Jan. 27, 2023

(65) Prior Publication Data
US 2024/0259166 A1 Aug. 1, 2024

(51) Int. Cl.
*H04L 5/00* (2006.01)
*H04B 17/309* (2015.01)
*H04W 24/10* (2009.01)

(52) U.S. Cl.
CPC ......... *H04L 5/0057* (2013.01); *H04B 17/309* (2015.01); *H04L 5/0051* (2013.01); *H04W 24/10* (2013.01)

(58) Field of Classification Search
CPC .............................. H04L 5/0057; H04W 24/10
See application file for complete search history.

(56) References Cited

U.S. PATENT DOCUMENTS

| | | | |
|---|---|---|---|
| 11,582,705 B1* | 2/2023 | Marupaduga | H04W 24/02 |
| 2020/0146063 A1* | 5/2020 | Xu | H04B 17/17 |
| 2021/0385818 A1* | 12/2021 | Levitsky | H04W 72/569 |
| 2024/0283597 A1* | 8/2024 | Elshafie | H04B 7/0456 |
| 2025/0089115 A1* | 3/2025 | Cao | H04W 72/0446 |

FOREIGN PATENT DOCUMENTS

EP 3681197 A1 7/2020

OTHER PUBLICATIONS

International Search Report and Written Opinion—PCT/US2023/085974—ISA/EPO—May 14, 2024.

* cited by examiner

*Primary Examiner* — Zhiren Qin
(74) *Attorney, Agent, or Firm* — Holland & Hart LLP

(57) ABSTRACT

Methods, systems, and devices for wireless communications are described. A user equipment (UE) may receive a configuration signal identifying reference signal resources for a channel measurement procedure performed on a multi-band channel, the configuration signal further identifying parameters of a feedback message associated with the channel measurement procedure, the parameters comprising a set of coherence bandwidth metrics for the multi-band channel that are to be indicated in the feedback message. The UE may perform the channel measurement procedure using the reference signal resources to identify the set of coherence bandwidth metrics for the multi-band channel. The UE may transmit the feedback message indicating the set of coherence bandwidth metrics.

30 Claims, 17 Drawing Sheets

MEASUREMENT REPORTING FOR FAST FADING DETECTION ERROR

TECHNICAL FIELD

The following relates generally to wireless communications, and more specifically to measurement reporting for fast fading detection error.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support measurement reporting for fast fading detection error. Generally, the described techniques provide for modifying an information element (IE) in radio resource control (RRC) configuration signaling to add coherence bandwidth metrics to channel state information (CSI) reporting by a user equipment (UE). In particular, aspects of the described techniques may modify the RRC configuration signaling to support the UE measuring and reporting the reference signal received power (RSRP) for physical downlink shared channel (PDSCH) resource block groups (RBGs) (e.g., a set of consecutive virtual resource blocks or a set of consecutive real or physical resource blocks) inside and outside of the coherence bandwidth of the bandwidth part (BWP) of the UE, or merely the bandwidth that the UE is configured for communications. For example, the base station may use configuration signaling to identify the reference signal resources (e.g., the CSI resources) for channel measurements on a multi-band channel (e.g., a channel having a BWP consisting of multiple subbands, subcarriers, etc.). The configuration signal may also signal or otherwise identify parameters for the feedback message for the channel measurement procedure, e.g., a set of coherence bandwidth metrics for the multi-band channel. The UE may perform the channel measurement procedure using the reference signal resources and indicate the set of coherence bandwidth metrics for the channel in the feedback message to the base station. The ability to measure and report the coherence bandwidth metrics in the CSI reporting enables the UE and base station to determine that poor channel performance may be due to fast frequency fading, for example, which may enable identification of the portion of the BWP that continues to perform well enough for communications.

A method of wireless communication at a UE is described. The method may include receiving a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message, performing the channel measurement procedure using the reference signal resources to identify the set of coherence bandwidth metrics for the multi-band channel, and transmitting the feedback message indicating the set of coherence bandwidth metrics.

An apparatus for wireless communication at a UE is described. The apparatus may include at least one processor, and memory coupled (e.g., operatively, communicatively, functionally, electronically, or electrically) with the at least one processor. The memory may store instructions executable by the at least one processor (e.g., directly, indirectly, after pre-processing, without pre-processing) to cause the UE to receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message, perform the channel measurement procedure using the reference signal resources to identify the set of coherence bandwidth metrics for the multi-band channel, and transmit the feedback message indicating the set of coherence bandwidth metrics.

Another apparatus for wireless communication at a UE is described. The apparatus may include means for receiving a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message, performing the channel measurement procedure using the reference signal resources to identify the set of coherence bandwidth metrics for the multi-band channel, and transmitting the feedback message indicating the set of coherence bandwidth metrics.

A non-transitory computer-readable medium storing code for wireless communication at a UE is described. The code may include instructions executable by a processor to receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message, perform the channel measurement procedure using the reference signal resources to identify the set of coherence bandwidth metrics for the multi-band channel, and transmit the feedback message indicating the set of coherence bandwidth metrics.

Some examples of the method, apparatuses, and non-transitory computer-readable medium described herein may further include operations, features, means, or instructions for determining a channel performance metric for each band of the multi-band channel, where each band may be associated with a resource block group, and determining the coherence bandwidth of the multi-band channel based on a first subset of channel performance metrics corresponding to a first subset of bands of the multi-band channel failing to satisfy a threshold.

Some examples of the method, apparatuses, and non-transitory computer-readable medium described herein may further include operations, features, means, or instructions for determining a non-coherence bandwidth of the multi-band channel based on a second subset of channel performance metrics corresponding to a second subset of bands of the multi-band channel satisfying the threshold.

In some examples of the method, apparatuses, and non-transitory computer-readable medium described herein, the channel performance metric includes, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

Some examples of the method, apparatuses, and non-transitory computer-readable medium described herein may further include operations, features, means, or instructions for detecting, based on the channel measurement procedure, an error condition for the multi-band channel, and determining, based on the set of coherence bandwidth metrics, that the error condition may be a fast frequency selective fading error.

Some examples of the method, apparatuses, and non-transitory computer-readable medium described herein may further include operations, features, means, or instructions for receiving a downlink control information (DCI) triggering the channel measurement procedure using the reference signal resources, where the channel measurement procedure may be performed based on the DCI.

In some examples of the method, apparatuses, and non-transitory computer-readable medium described herein, the configuration signal includes a radio resource control (RRC) signal.

In some examples of the method, apparatuses, and non-transitory computer-readable medium described herein, the configuration signal identifying reference signal resources includes a CSI report configuration information element.

A method of wireless communication at a base station is described. The method may include identifying reference signal resources for a channel measurement procedure to be performed by a UE for a multi-band channel, transmitting, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message, and receiving the feedback message from the UE indicating the set of coherence bandwidth metrics.

An apparatus for wireless communication at a base station is described. The apparatus may include at least one processor, and memory coupled (e.g., operatively, communicatively, functionally, electronically, or electrically) with the at least one processor. The memory may store instructions executable by the at least one processor (e.g., directly, indirectly, after pre-processing, without pre-processing) to cause the base station (e.g., a network device) to identify reference signal resources for a channel measurement procedure to be performed by a UE for a multi-band channel, transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message, and receive the feedback message from the UE indicating the set of coherence bandwidth metrics.

Another apparatus for wireless communication at a base station is described. The apparatus may include means for identifying reference signal resources for a channel measurement procedure to be performed by a UE for a multi-band channel, transmitting, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message, and receiving the feedback message from the UE indicating the set of coherence bandwidth metrics.

A non-transitory computer-readable medium storing code for wireless communication at a base station is described. The code may include instructions executable by a processor to identify reference signal resources for a channel measurement procedure to be performed by a UE for a multi-band channel, transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message, and receive the feedback message from the UE indicating the set of coherence bandwidth metrics.

Some examples of the method, apparatuses, and non-transitory computer-readable medium described herein may further include operations, features, means, or instructions for determining, based on the feedback message, a channel performance metric for each band of the multi-band channel, where each band may be associated with a resource block group, and determining a coherence bandwidth of the multi-band channel based on a first subset of channel performance metrics corresponding to a first subset of bands of the multi-band channel failing to satisfy a threshold.

Some examples of the method, apparatuses, and non-transitory computer-readable medium described herein may further include operations, features, means, or instructions for determining a non-coherence bandwidth of the multi-band channel based on a second subset of channel performance metrics corresponding to a second subset of bands of the multi-band channel satisfying the threshold.

In some examples of the method, apparatuses, and non-transitory computer-readable medium described herein, the channel performance metric includes, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

Some examples of the method, apparatuses, and non-transitory computer-readable medium described herein may further include operations, features, means, or instructions for detecting, based on the feedback message, an error condition for the multi-band channel, and determining, based on the set of coherence bandwidth metrics, that the error condition may be a fast frequency selective fading error.

Some examples of the method, apparatuses, and non-transitory computer-readable medium described herein may further include operations, features, means, or instructions for transmitting a DCI triggering the channel measurement procedure using the reference signal resources, where the feedback message may be received based on the DCI.

In some examples of the method, apparatuses, and non-transitory computer-readable medium described herein, the configuration signal includes a RRC signal.

In some examples of the method, apparatuses, and non-transitory computer-readable medium described herein, the configuration signal identifying reference signal resources includes a CSI report configuration information element.

DETAILED DESCRIPTION

Figure 1:
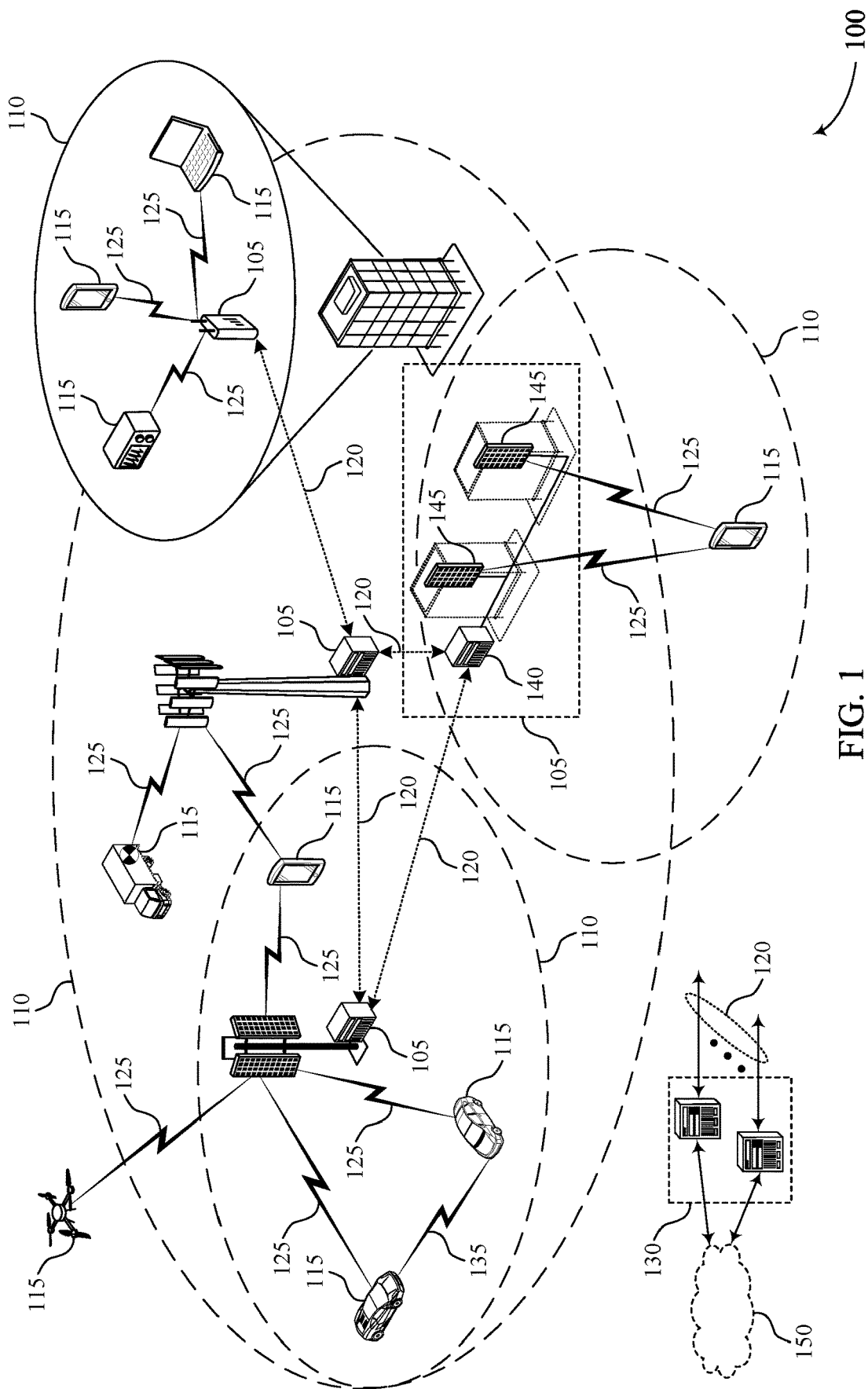
FIG. 1 illustrates an example of a system for wireless communications that supports measurement reporting for fast fading detection error in accordance with aspects of the present disclosure.

A user equipment (UE) may be configured via radio resource control (RRC) signaling by a serving base station for channel state information (CSI) reporting. The RRC configuration typically identifies reference signal (RS) resources used for CSI channel measurements, as well as the CSI reporting configurations to be included in the CSI report, e.g., which parameters the UE is to include in the feedback message for its CSI reporting. Some RRC configurations for CSI reporting may not provide a mechanism for the UE to measure and report the reference signal receive power (RSRP) values both within and outside of a coherence bandwidth of a bandwidth part (BWP). This prevents the UE/base station from being able to determine when the channel is performing poorly due to fast frequency selecting fading, which may limit available response strategies and/or result in a total loss of communications.

A coherence bandwidth broadly refers to a portion of the BWP configuration (e.g., a subset of bands in the multi-band channel) for the UE that is performing similarly. For example, the coherence bandwidth of a multi-band channel may refer to a threshold number of bands (e.g., a subset of bands) of the multi-band channel that have similar channel performance characteristics. For example, the bands of the BWP performing within a threshold range of each other may form the coherence bandwidth of the channel. As the coherence bandwidth generally refers to bands that are performing within the threshold range of each other, this means that coherence bandwidth could refer to a subset of bands performing well (e.g., satisfying a threshold) or to a subset of bands performing poorly (e.g., failing to satisfy the threshold). As used herein, the coherence bandwidth of the BWP generally refers to the set of bands of a channel that are performing poorly (e.g., failing to satisfy a threshold).

Aspects of the disclosure are initially described in the context of wireless communications systems. Generally, the described techniques provide for modifying an information element (IE) in RRC configuration signaling to add coherence bandwidth metrics to CSI reporting by a UE. In particular, aspects of the described techniques may modify the RRC configuration signaling to support the UE measuring and reporting the RSRP for resource block groups (RBGs) (e.g., a set of consecutive virtual resource blocks or a set of consecutive real or physical resource blocks) inside and outside of the coherence bandwidth of the BWP of the UE, or merely the bandwidth that the UE is configured for communications. For example, the base station may use configuration signaling to identify the reference signal resources (e.g., the CSI resources) for channel measurements on a multi-band channel (e.g., a channel having a BWP consisting of multiple subbands, subcarriers, subchannels, etc.). The configuration signal may also signal or otherwise identify parameters for the feedback message for the channel measurement procedure, e.g., a set of coherence bandwidth metrics for the multi-band channel. The UE may perform the channel measurement procedure using the reference signal resources and indicate the set of coherence bandwidth metrics for the channel in the feedback message to the base station. The ability to measure and report the coherence bandwidth metrics in the CSI reporting enables the UE and base station to identify or otherwise determine that poor channel performance may be due to fast frequency fading, for example, on only a subset of bands in the multi-band channel.

Aspects of the disclosure are further illustrated by and described with reference to apparatus diagrams, system diagrams, and flowcharts that relate to measurement reporting for fast fading detection error.

FIG. 1 illustrates an example of a wireless communications system 100 that supports measurement reporting for fast fading detection error in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Components within a wireless communication system may be coupled (for example, operatively, communicatively, functionally, electronically, and/or electrically) to each other.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies, as well as other systems and radio technologies, including future systems and radio technologies, not explicitly mentioned herein.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive a configuration signal identifying reference signal resources for a channel measurement procedure performed on a multi-band channel, the configuration signal further identifying parameters of a feedback message associated with the channel measurement procedure, the parameters comprising a set of coherence bandwidth metrics for the multi-band channel that are to be indicated in the feedback message. The UE 115 may perform the channel measurement procedure using the reference signal resources to identify the set of coherence bandwidth metrics for the multi-band channel. The UE 115 may transmit the feedback message indicating the set of coherence bandwidth metrics.

A base station 105 may identify reference signal resources for a channel measurement procedure to be performed by a UE 115 for a multi-band channel. The base station 105 may transmit, to the UE 115, a configuration signal identifying the reference signal resources, the configuration signal further identifying parameters of a feedback message associated with the channel measurement procedure, the parameters comprising a set of coherence bandwidth metrics for the multi-band channel that are to be indicated in a feedback message. The base station 105 may receive the feedback message from the UE 115 indicating the set of coherence bandwidth metrics.

Figure 2:
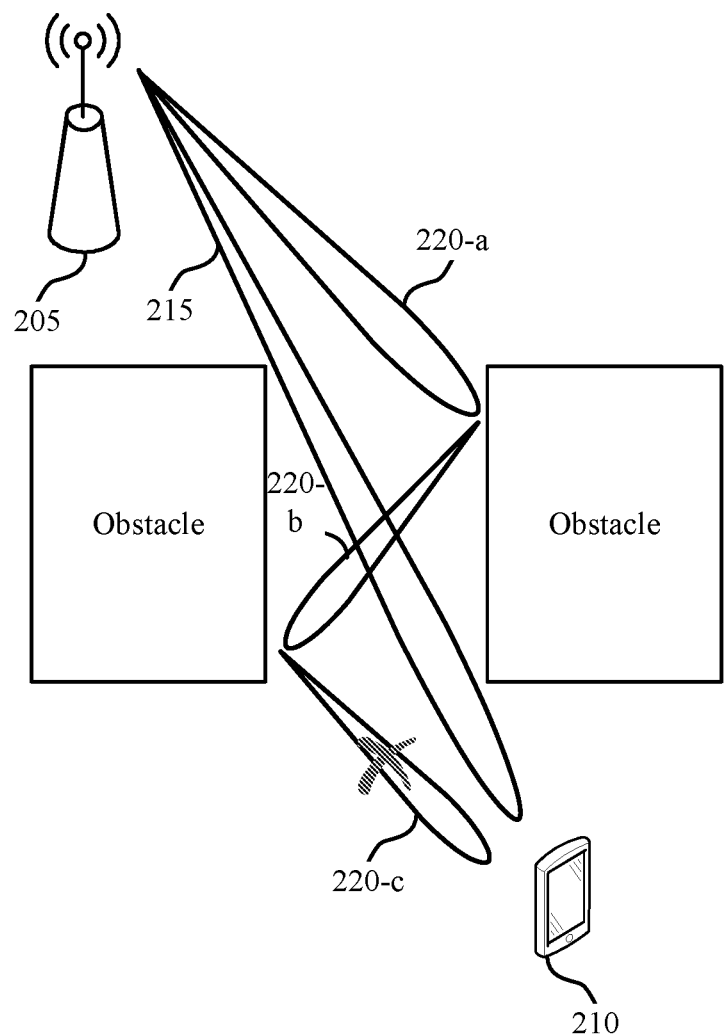
FIG. 2 illustrates an example of a wireless communication system that supports measurement reporting for fast fading detection error in accordance with aspects of the present disclosure.

FIG. 2 illustrates an example of a wireless communication system 200 that supports measurement reporting for fast fading detection error in accordance with aspects of the present disclosure. In some examples, wireless communication system 200 may implement aspects of wireless communication system 100. Wireless communication system 200 may include base station 205 and/or UE 210, which may be examples of corresponding devices described herein.

Base station 205 and UE 210 may communicate over a set of bands (which may also be referred to as subbands, subcarriers, subchannels, etc.) in the frequency domain, which may collectively be referred to as the bandwidth or BWP of the channel (e.g., the multi-band channel) being used for communications between base station 205 and UE 210. Accordingly, base station 205 may perform downlink transmissions to UE 210 over some or all of the bands of a multi-band channel.

UE 210 may be configured for CSI measurement and reporting by base station 205, e.g., via RRC signaling. The RRC configuration signaling (e.g., the configuration signal) may identify CSI-RS resources used for CSI channel measurements, as well as the CSI reporting configurations to be included in the CSI report, e.g., which parameters the UE is to include in the feedback message during its CSI reporting. For example, base station 205 may transmit or otherwise convey a configuration signal to UE 210 that identifies the RS resources for the channel measurement procedure. UE 210 may generally perform channel measurements using the RS resources indicated in the configuration signal to determine how well the channel is performing. For example, UE 210 may determine the RSRP level for the channel and report the RSRP levels to base station 205 in the feedback message. When base station 205 and UE 210 are communicating over a multi-band channel, the CSI report (e.g., the feedback message) may indicate RSRP levels for the bands of the multi-band channel configured for CSI reporting by the configuration signal.

However, some RRC configurations for CSI reporting may not provide a mechanism for the UE to report a set of coherence bandwidth metrics for both within and outside of a coherence bandwidth of the BWP. That is, some wireless communication systems may not include configuration signaling from base station 205 that allows UE 210 to measure and report various channel performance metrics based on the coherence bandwidth of the multi-band channel. This prevents the UE/base station from being able to determine when the channel is performing poorly due to fading, e.g., such as fast frequency selective fading. Accordingly, this may eliminate the response strategies that could be adopted to counter the fast frequency selective fading error condition, e.g., diversity schemes, interleaving, or forward error correction. That is result in a waste for the bands of the multi-band channel that are performing well and could otherwise support continued communications.

That is, the presence of obstacles or other reflectors (e.g., any object or surface that reflects or otherwise interferes with the propagation of radio waves) between base station 205 and UE 210 may interfere with transmitted signals, e.g., may negatively impact the signal as it propagates along the propagation path that the signal traverses. For example, base station 205 may transmit a signal to UE 210 which creates a first path 215 and a second path 220, although it is to be understood that many paths may be associated with the transmitted signal. As is illustrated in FIG. 2, first path 215 corresponds to a direct line of sight path between base station 205 and UE 210. Accordingly, the signal transmitted along the first path 215 may otherwise arrive at UE 210 at an acceptable receive power level. However, the signal propagating along the second path 220 is reflected between obstacles in the environment surrounding base station 205 and UE 210. This results in UE 210 receiving the superposition of multiple copies of the transmitted signal (e.g., second path 220-*a*, second path 220-*b*, and second path 220-*c*), each traversing a different path. As a result, each copy of the transmitted signal may be associated with the different attenuation level (e.g., RSRP level), delay (e.g., in the time domain), or phase shift. This may create constructive or destructive interference with respect to the transmitted signal. A strong destructive interference may be referred to as a deep fade. A fade error condition for the channel may correspond to a slow fading (e.g., when the coherence time of the channel is large relative to the delay requirements of the application) or fast fading (e.g., when the coherence time of the channel is small relative to the delay requirements of the application).

The coherence of the channel may be based on the Doppler spread of the channel. That is, changes in velocity associated with signal reflections cause a shift in the frequency of the signal transmitted along each signal path. This may be referred to generally as the Doppler shift, with signals traveling along different paths experiencing different Doppler shifts, which may correspond to the different rates of change and phase along each path. The difference in Doppler shifts between different signal components contribute to a signal fading channel may correspond to the Doppler spread of the channel.

Selective fading or frequency selective fading may correspond to a partial cancellation of a wireless signal by itself (e.g., when a transmitted signal arrives at UE 210 via different paths, the signal arriving via one path canceling or being destructive to the signal arriving in a different path). Selective fading may result in a slow, cyclic disturbance, with the cancellation effect being most pronounced at one particular frequency, which changes constantly sweeping through the received signal bands. In the example illustrated in FIG. 2, the signal traveling along the second path 220 may interfere with the signal traveling along the first path 215, e.g., cause a destructive interference.

A coherence bandwidth broadly refers to a portion of the BWP configuration (e.g., a subset of bands in the multi-band channel) for the UE that is performing similarly. For example, the coherence bandwidth of a multi-band channel may refer to a subset of bands of the multi-band channel that have similar performance characteristics. The subset of bands of the BWP may be performing within a threshold range of each other to form the coherence bandwidth of the channel. As the coherence bandwidth generally refers to bands that are performing within the threshold range of each other, this means that coherence bandwidth may refer to a number of bands performing well (e.g., satisfying a threshold) or to a number of bands performing poorly (e.g., failing to satisfy the threshold). As used herein, the coherence bandwidth of the BWP generally refers to the set of bands of a multi-band channel that are performing poorly (e.g., failing to satisfy a threshold). For example, the coherence bandwidth in terms or frequency selective fading may be smaller than the bandwidth of the signal (e.g., the BWP over which the transmitted signal is conveyed), with different frequency components (e.g., bands of the multi-band channel) of the signal experiencing uncorrelated fading. Accordingly, when wireless communication systems do not provide a mechanism for UE 210 to report coherence bandwidth metrics for the channel, this may result in UE 210 experiencing communication interruptions due to interference in the channel, but being unable to quantify that the interference or error condition is associated with fast frequency selective fading.

Accordingly, aspects of the described techniques provide for base station 205 to configure UE 210 with CSI resources as well as feedback message parameters that include wideband RSRP indications, as well as other statistics, in the feedback message from UE 210. The CSI resources identified or otherwise indicated in the configuration signal may enable RSRP measurements across various coherence bandwidths of the channel.

In some aspects, this may include base station 205 transmitting (and UE 210 receiving) a configuration signal identifying reference signal resources (e.g., CSI-RS resources for a channel measurement procedure performed on a multi-band channel, such as a channel spanning a BWP) by UE 210. For example, base station 205 may identify or otherwise select the reference signal resources for the channel measurement procedure to be performed by UE 210. The configuration signal may also identify parameters for the feedback message resulting from the channel measurement procedure by UE 210. Broadly, the identified parameters may include, but are not limited to, a set of coherence bandwidth metrics for the multi-band channel that are to be indicated in the feedback message. As discussed, the configuration signal may include RRC signaling conveying one or more information elements (IE(s)) indicating the reference signal resources and/or the parameters of the feedback message. For example, base station 205 may transmit an RRC configuration signal to UE 210 carrying or otherwise conveying a CSI-report configuration IE, e.g., CSI-ReportConfig IE. One non-limiting example of the information indicated in the configuration signal (e.g., the CSI reporting configuration IE) may include, but is not limited to, the example below:

CSI-ReportConfig Information Element

```
CSI-ReportConfig ::=          SEQUENCE {
reportQuantity                CHOICE {
   none                       NULL,
   cri-RI-PMI-CQI                       NULL,
   cri-RI-i1                  NULL,
   cri-RI-i1-CQI                        SEQUENCE {
      pdsch-BundleSizeForCSI             ENUMERATED {n2, n4}
OPTIONAL NeedS
   },
   cri-RI-CQI                 NULL,
   cri-RSRP                   NULL,
   ssb-Index-RSRP                       NULL,
   cri-RI-LI-PMI-CQI                    NULL
   cri-RSRP-BeamCoherenceTimeBWPAverage
   cri-RSRP-MaxAcrossPRBs
   cri-RSRP-MinAcrossPRBs
   cri-RSRP-Wideband-Delta-AcrossPRBs
   cri-RSRP-Wideband-Delta-Time
           cri-RSRP-PerPRB-Delta
   cri-Interference-PerPRB
   cri-SINR-PerPRB
   cri-InterferenceWidebandAvg
   cri-InterferenceWidebandStd
           cri-InterferenceMinAcrossPRBs
   ssb-Interference-PerPRB
   ssb-SINR-PerPRB
   ssb-InterferenceWidebandAvg
   ssb-InterferenceWidebandStd
   ssb-InterferenceWidebandStd
       cri-RSRP_AveragePDSCH_RBG
       cri-RSRP_AverageOutsideCoherenceBandwith
       SSB-RSRP_AveragePDSCH_RBG
       SSB-RSRP_AverageOutsideCoherenceBandwith
       CoherenceBandwidth
   },
```

Where "cri" refers to a CSI-RS resource indicator and "SSB" refers to a synchronization signal block. As discussed above, the RBGs may refer to a set of consecutive virtual resource blocks used for conveying information in the signal transmitted from base station 205 to UE 210. As also discussed above, the RBGs may refer to a set of consecutive real or physical resource blocks used for conveying information in the signal transmitted from base station 205 to UE 210. Generally, the configuration signal conveying the CSI reporting configuration IE may provide a mechanism whereby RSRP measurements both within and outside of the coherence bandwidth may be measured and reported by UE 210.

Accordingly, the channel measurement procedure may include UE 210 monitoring for the reference signals transmitted by base station 205 (e.g., the CSI-RS) when performing the channel measurement procedure. For example, UE 210 may monitor the resources indicated in the configuration signal to determine a channel performance metric for each band, or a set of bands, of the multi-band channel. In some aspects, each band of the multi-band channel may correspond to an RBG. UE 210 may identify or otherwise determine the coherence bandwidth of the channel based on the channel performance metrics for a subset of the bands of the channel failing to satisfy a threshold, e.g., based on the first subset of bands of the channel performing poorly. The subset of bands of the channel performing poorly (e.g., a first subset of bands of the multi-band channel) may form or otherwise define the coherence bandwidth of the channel. Conversely, a second subset of bands of the multi-band channel may have channel performance metrics satisfying a threshold (e.g., performing well), which may form or otherwise define the non-coherence bandwidth of the multi-band channel.

At a high level, an error due to fast frequency selective fading may be based on an erroneous reception by UE 210. For example, the fast fading error may be based on a received signal-to-interference-plus-noise ratio (SINR) that may be less than a SINR threshold (e.g., $SINR_{Rx} < SINR_{Threshold}$) in PDSCH RBGs corresponding to a PDSCH beam identifier (ID) (e.g., beam ID M). The fast fading error may be based on a received signal strength that is below an estimated or expected signal strength (e.g., $S_{Rx} < S_{est}$) in PDSCH RBGs corresponding to PDSCH beam ID M. The fast fading error may be based on a given duration (e.g., T4). The fast fading error may be based on the received signal strength from other RBGs at a frequency distance greater than a coherence (e.g., the second subset of bands) that are above a signal strength threshold (e.g., $S_{Threshold}$). However, an RBG change at a frequency, $RBG_j$, with a frequency distance higher than the coherence bandwidth may still provide a viable link to support communications between base station 205 and UE 210. That is, a multi-band channel experiencing fast frequency selective fading error may still have usable bands for communications, such as the second subset of bands having a corresponding channel performance metrics that satisfy the threshold.

More particularly, the channel performance metrics measured or otherwise determined by UE 210 during the channel measurement procedure (and used to determine whether the channel is experiencing a fast frequency selecting fading error condition) may include, but are not limited to, a first interference-to-noise level for the first subset of bands, a first receive power level for the first subset of bands, a second receive power level for the second subset of bands, an instantaneous received interference averaged across the first subset of bands, a difference between an instantaneous and a maximum receive power level across all bands in the multi-band channel, or a change in an instantaneous receive power level greater than a change threshold.

For example, the first interference-to-noise level for the first subset of bands may correspond to the SINR in PDSCH RBGs averaged over the PDSCH PRBs that are below a threshold, e.g., the instantaneous SINR averaged over all PDSCH RBGs ($SINR_{average\_RBGs} < SINR_{Threshold12}$). This may indicate that the received PDSCH has not been decoded correctly, e.g., has not been successfully received and decoded. In some examples, the first receive power level of the first subset of bands may correspond to a signal strength, such as the layer 1 RSRP in PDSCH RBGs averaged over PDSCH PRBs below a threshold, e.g., the instantaneous signal strength averaging over all PDSCH RBGs ($L1\_RSRP_{average\_RBGs} < L1\_RSRP_{Threshold13}$). That is, the useful signal strength may be below a threshold, which may indicate that the PDSCH RBGs are experiencing frequency selective fading. In some examples, the second receive power level for the second subset of bands may correspond to the received signal strength in RBGs at a frequency distance that is larger than the coherence bandwidth averaged over PDSCH PRBs above a threshold, e.g., the instantaneous layer 1 RSRP averaging over all PDSCH RBGs ($L1\_RSRP_{average\_RBGs\_outsideCoherenceBw} > L1\_RSRP_{Threshold14}$). This may indicate that RBGs outside of the current PDSCH and coherence bandwidth are not experiencing frequency selective fading.

In some examples, the instantaneous received interference averaged across the first subset of bands may correspond to the instantaneous interference standard averaged across all PDSCH RBGs below a threshold at time instance/ ($Interference_{average\_RBGs} < Interference_{Threshold15}$). This may indicate that the current PDSCH RBGs are not experiencing frequency selective fading. In some examples, a difference between an instantaneous and a maximum receive power level across all bands in the multi-band channel may correspond to the difference between the instantaneous received signal strength in PDSCH RBGs over the maximum receive signal strength among all RBGs in the BWP a time instance t1 ($|L1\_RSRP_{average\_RBGs} - \max(L1\_RSRP_{BWP})| > delta_{Threshold16}$). In some examples, the change in an instantaneous receive power level greater than a change threshold may correspond to a significant change of instantaneous received signal strength in PDSCH RBGs ($L1\_RSRP_{t1} - L1\_RSRP_{t0} < L1\_RSRP\_Delta_{Threshold17}$). This may indicate a sudden drop of the useful signal strength.

In some examples, once the channel performance metrics corresponding to the first interference-to-noise level for the first subset of bands, first receive power level for the first subset of bands, and second receive power level for the second subset of bands are satisfied (e.g., the corresponding threshold levels are met), this may provide the primary indication that the error condition corresponds to an error detection due to fast frequency selective fading. In some aspects, the instantaneous received interference averaged across the first subset of bands, the difference between an instantaneous and a maximum receive power level across all bands, and the change in the instantaneous receive power level greater than a change threshold being satisfied (e.g., the corresponding threshold levels are met) may strengthen or confirm the determination that the error condition corresponds to a fast frequency selective fading error condition. That is, UE 210 may detect or otherwise determine that the error condition for the multi-band channel corresponds to a fast frequency selective fading error based on the set of coherence bandwidth metrics determined during the channel measurement procedure.

Accordingly, UE 210 may perform the channel measurement procedure to determine the channel performance metric for each band of the multi-band channel in order to determine the coherence bandwidth of the channel. UE 210 may also determine that the error condition for the channel corresponds to a fast frequency selective fading error, e.g., based on any combination of the channel performance metrics. UE 210 may transmit or otherwise convey a feedback message to base station 205 indicating the set of coherence bandwidth metrics. For example, UE 210 may transmit the feedback message in a physical uplink control channel (PUCCH) and/or physical uplink shared channel (PUSCH) transmission. UE 210 may configure the feedback message to indicate the set of coherence bandwidth metrics (e.g., may indicate one or more of the channel performance metrics in the feedback message) and/or to indicate that the error condition for the multi-band channel corresponds to a fast frequency selective fading error condition.

In some aspects, UE 210 may perform the channel measurement procedure may be initiated or otherwise triggered based on receiving the configuration signal identifying the reference signal resources and parameters for the feedback message. In some aspects, the channel measurement procedure may be initiated or otherwise triggered based on UE 210 receiving a DCI, MAC CE, etc., triggering the channel measurement procedure.

Figure 3:
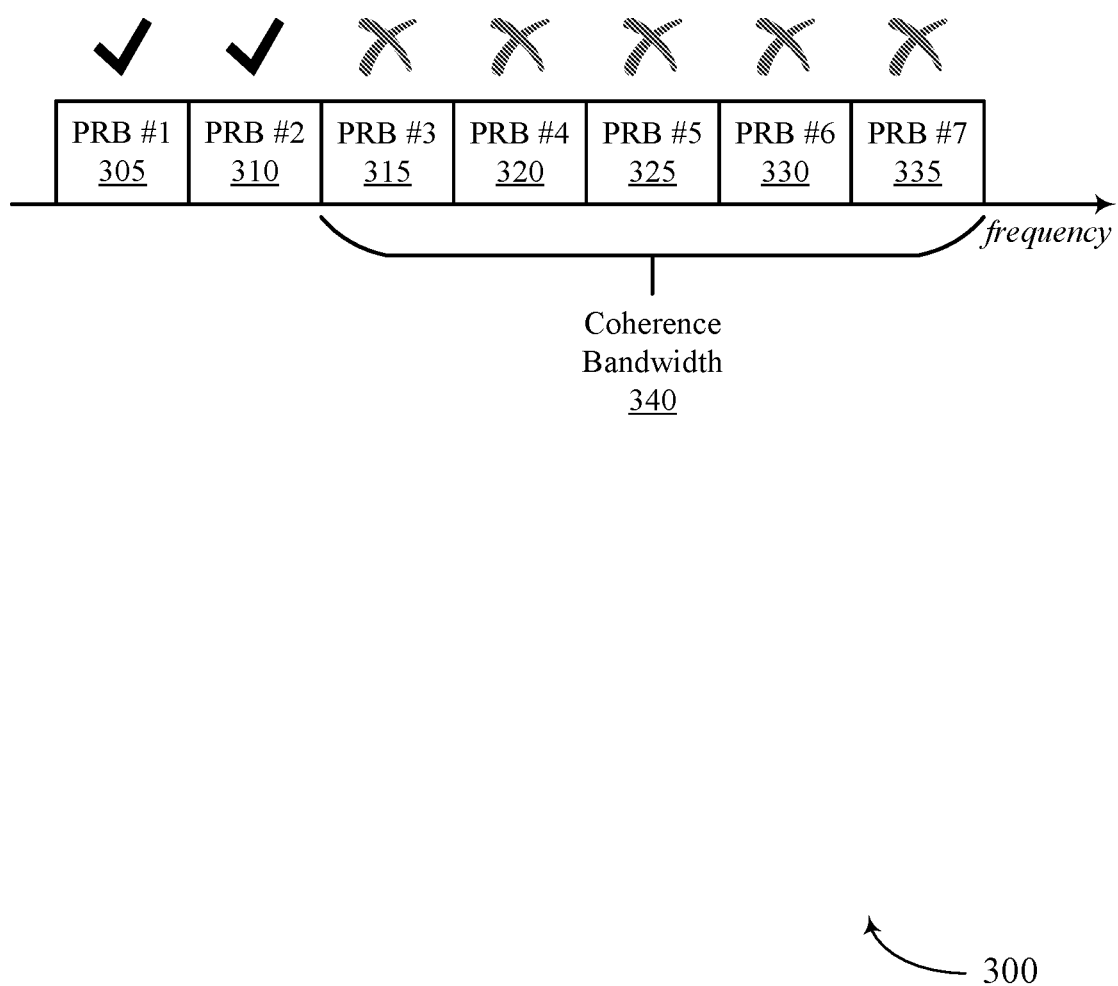
FIG. 3 illustrates an example of a bandwidth configuration that supports measurement reporting for fast fading detection error in accordance with aspects of the present disclosure.

FIG. 3 illustrates an example of a bandwidth configuration 300 that supports measurement reporting for fast fading detection error in accordance with aspects of the present disclosure. In some examples, bandwidth configuration 300 may implement aspects of wireless communication systems 100 and/or 200. Aspects of bandwidth configuration 300 may be implemented by a base station and/or UE, which may be examples of corresponding devices described herein.

As discussed above, the described techniques provide for modifying an IE in RRC configuration signaling to add coherence bandwidth metrics to CSI reporting. In particular, aspects of the described techniques may modify the RRC configuration signaling to support the UE measuring and reporting the RSRP for downlink data RBGs (e.g., PDSCH RBGs) inside and outside of the coherence bandwidth of the BWP of the UE, or merely the bandwidth that the UE is configured for communications. For example, the base station may use configuration signaling to identify the reference signal resources (e.g., the CSI resources) for channel measurements on a multi-band channel (e.g., a channel having a BWP consisting of multiple subbands, subcarriers, subchannels, etc.). The configuration signal may also signal or otherwise identify parameters for the feedback message for the channel measurement procedure, e.g., a set of coherence bandwidth metrics for the multi-band channel. The UE may perform the channel measurement procedure using the reference signal resources and indicate the set of coherence bandwidth metrics for the channel in the feedback message to the base station. That is, the UE may determine channel performance metrics for each band of the multi-band channel during the channel measurement procedure. The channel performance metrics may be used to identify or otherwise determine whether the channel is experiencing and error condition corresponding to a fast frequency selective fading error.

For example, the UE may perform the channel measurement procedure in each band of the multi-band channel. As discussed, each band may correspond to one or more subbands (e.g., subcarriers) in the frequency domain over which the base station transmits information to the UE. Each RBG may correspond to a set of virtual resource blocks, with the virtual resource blocks being mapped to physical resources, such as physical resource blocks (PRBs). Each RBG may correspond to a set of real/physical resources, such as PRBs. In some aspects, each PRB may span 12 subcarriers in the frequency domain. Accordingly, in the non-limiting example illustrated in bandwidth configuration 300, the UE may be configured with a BWP spanning seven PRBs, or 84 subcarriers in the frequency domain. In some aspects, this may include the base station indicating a reference signal resources for some or all of the bands of the multi-band channel.

Accordingly, the UE may use the reference signal resources indicated in the configuration signal to perform the channel measurement procedure to determine channel performance metrics for each band. Based on the channel performance metrics, the UE may determine the coherence bandwidth 340 of the multi-band channel based on the first subset of channel performance metrics corresponding to a first subset of bands failing to satisfy a threshold (e.g., the bands that are performing poorly). The UE may also determine a non-coherence bandwidth based on a second subset of channel performance metrics corresponding to a second subset of bands satisfying the threshold (e.g., the bands that are performing well).

More particularly, the UE may perform the channel measurement procedure on the bands corresponding to PRB 305, PRB 310, PRB 315, PRB 320, PRB 325, PRB 330, and PRB 335 (e.g., each band of the multi-band channel), to identify the corresponding channel performance metrics. Based on the channel performance metrics, the UE may determine whether or not the channel is experiencing an error condition due to fast frequency selective fading. For example, the UE may determine that the channel performance metrics corresponding to the bands of PRB 305 and PRB 310 (e.g., a second subset of subbands) satisfy the threshold. Accordingly, the bands corresponding to PRB 305 and PRB 310 may define the non-coherence bandwidth for the channel, which may indicate the bands of the multi-band channel that may still serve as a valid bands supporting communications between the UE and base station.

However, the UE may determine that the channel performance metrics corresponding to the bands of PRB 315, PRB 320, PRB 325, PRB 330, and PRB 335 (e.g., a first subset of bands) failed to satisfy the threshold. Accordingly, the bands corresponding to PRB 315, PRB 320, PRB 325, PRB 330, and PRB 335 may define the coherence bandwidth 340 of the channel, which may indicate the bands of the multi-band channel that are unable to serve as valid bands supporting communications between the UE and base station. That is, identification of the fast frequency selective error condition corresponding to the coherence bandwidth 340 may enable the UE to measure and report the set of coherence bandwidth metrics to the base station. This may improve scheduling decisions for communications between the base station a UE when the channel experiences the fast frequency selective fading error condition. That is, this information may be enabled the network to extract available necessary information for the detection of an error occurring due to interference. Moreover, this may reduce overhead signaling (e.g., the UE may report fewer measurement quantities).

Figure 4:
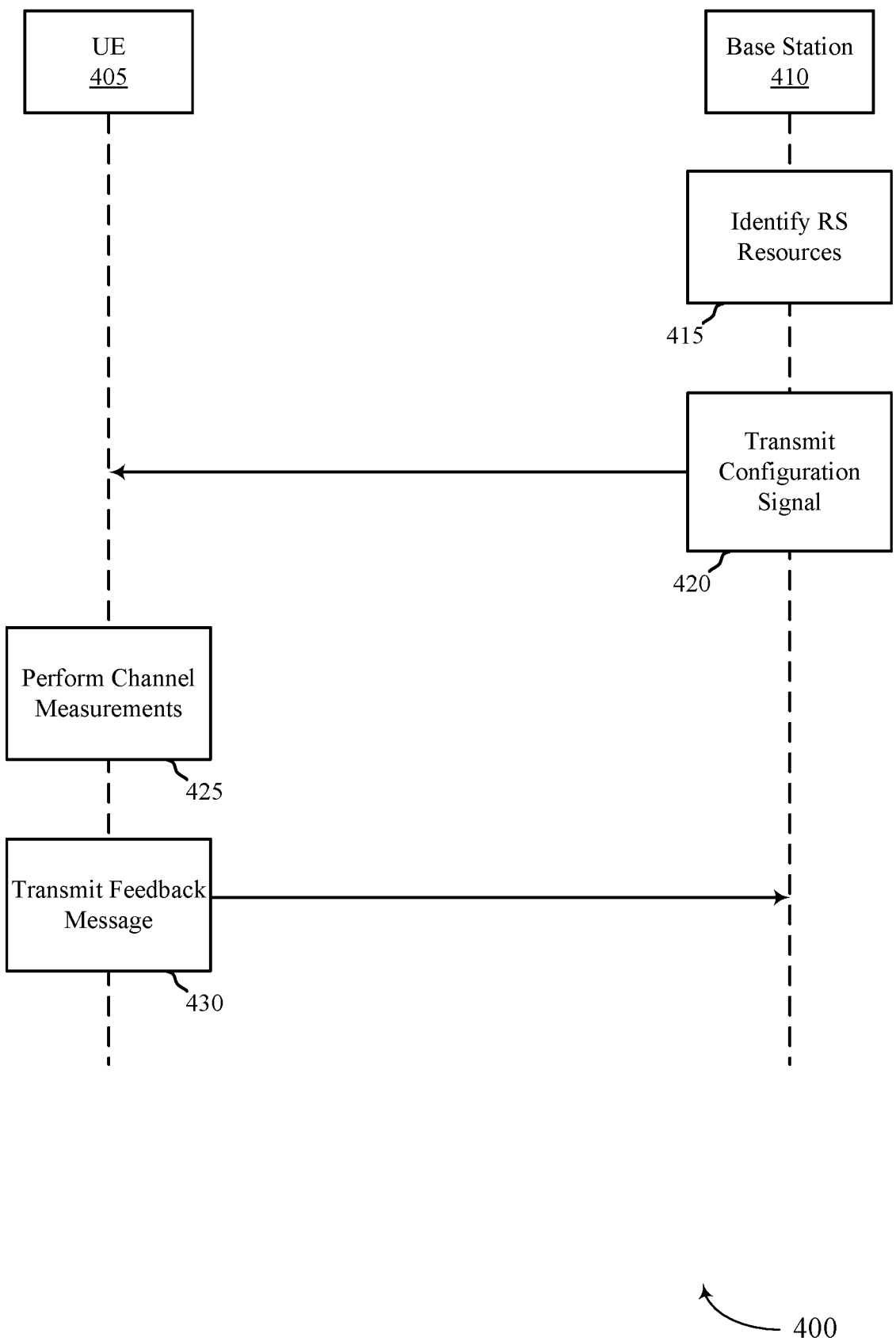
FIG. 4 illustrates an example of a process that supports measurement reporting for fast fading detection error in accordance with aspects of the present disclosure.

FIG. 4 illustrates an example of a process 400 that supports measurement reporting for fast fading detection error in accordance with aspects of the present disclosure. In some examples, process 400 may implement aspects of wireless communication systems 100 and/or 200 and/or bandwidth configuration 300. Aspects of process 400 may be implemented by UE 405 and/or base station 410 amount which may be examples of the corresponding devices described herein.

At 415, base station 410 may select or otherwise identify reference signal resources for a channel measurement procedure to be performed by UE 405 for the multi-band channel. For example, base station 410 may identify CSI-RS resources to be used for CSI measurement and reporting by UE 405.

At 420, base station 410 may transmit (and UE 405 may receive) a configuration signal identifying the reference signal resources. The configuration signal may also identify parameters of a feedback message associated with the channel measurement procedure, the parameters including a set of coherence bandwidth metrics for the multi-band channel that are to be indicated in a feedback message. In some aspects, the configuration signal may include an RRC signal and/or identify a CSI reporting configuration IE.

At 425, UE 405 may perform the channel measurement procedure using the reference signal resources to identify the set of coherence bandwidth metrics for the multi-band channel. In some aspects, this may include base station 410 transmitting (and UE 405 receiving) a DCI triggering the channel measurement procedure using the reference signal resources.

In some aspects, this may include UE 405 determining a channel performance metric for each band of the multi-band channel. In some aspects, each band may be associated with an RBG. UE 405 may determine the coherence bandwidth of the multi-band channel based on the first subset of channel performance metrics corresponding to a first subset of bands of the multi-band channel failing to satisfy a threshold. UE 405 may determine a non-coherence bandwidth of the multi-band channel based on a second subset of channel performance metrics corresponding to a second subset of bands of the multi-band channel satisfying a threshold.

In some aspects, the channel performance metrics identified by UE 405 may include, but are not limited to, a first interference-to-noise level for the first subset of bands, a first receive power level for the first subset of bands, a second receive power level for a second subset of bands having corresponding channel performance metrics satisfying the threshold, an instantaneous received interference averaged across the first subset of bands, a difference between an instantaneous and a maximum receive power level across all bands in the multi-band channel, or a change in an instantaneous receive power level greater than a change threshold. UE 405 and/or base station 410 may utilize one, some, or all of the channel performance metrics, in any combination, during the channel measurement procedure.

In some aspects, this may include UE 405 detecting otherwise determining an error condition for the multi-band channel based on the channel measurement procedure. Based on the set of coherence bandwidth metrics, UE 405 may determine that the error condition corresponds to a fast frequency selective fading error.

At 430, UE 405 may transmit (and base station 410 may receive) the feedback message indicating the set of coherence bandwidth metrics. In some aspects, this may include base station 410 determining the channel performance metric for each band of the multi-band channel based on the feedback message. Accordingly, base station 410 may determine the coherence bandwidth of the multi-band channel based on the first subset of channel performance metrics corresponding to the first subset of bands of the multi-band channel failing to satisfy the threshold. Base station 410 may also identify or otherwise determine a non-coherence bandwidth of the multi-band channel based on a second subset of channel performance metrics corresponding to a second subset of bands of the multi-band channel satisfying the threshold.

In some aspects, this may include base station 410 detecting an error condition for the multi-band channel based on the feedback message. For example, base station 410 may determine that the error condition corresponds to a fast frequency selective fading error based on the set of coherence bandwidth metrics indicated in the feedback message.

Figure 5:
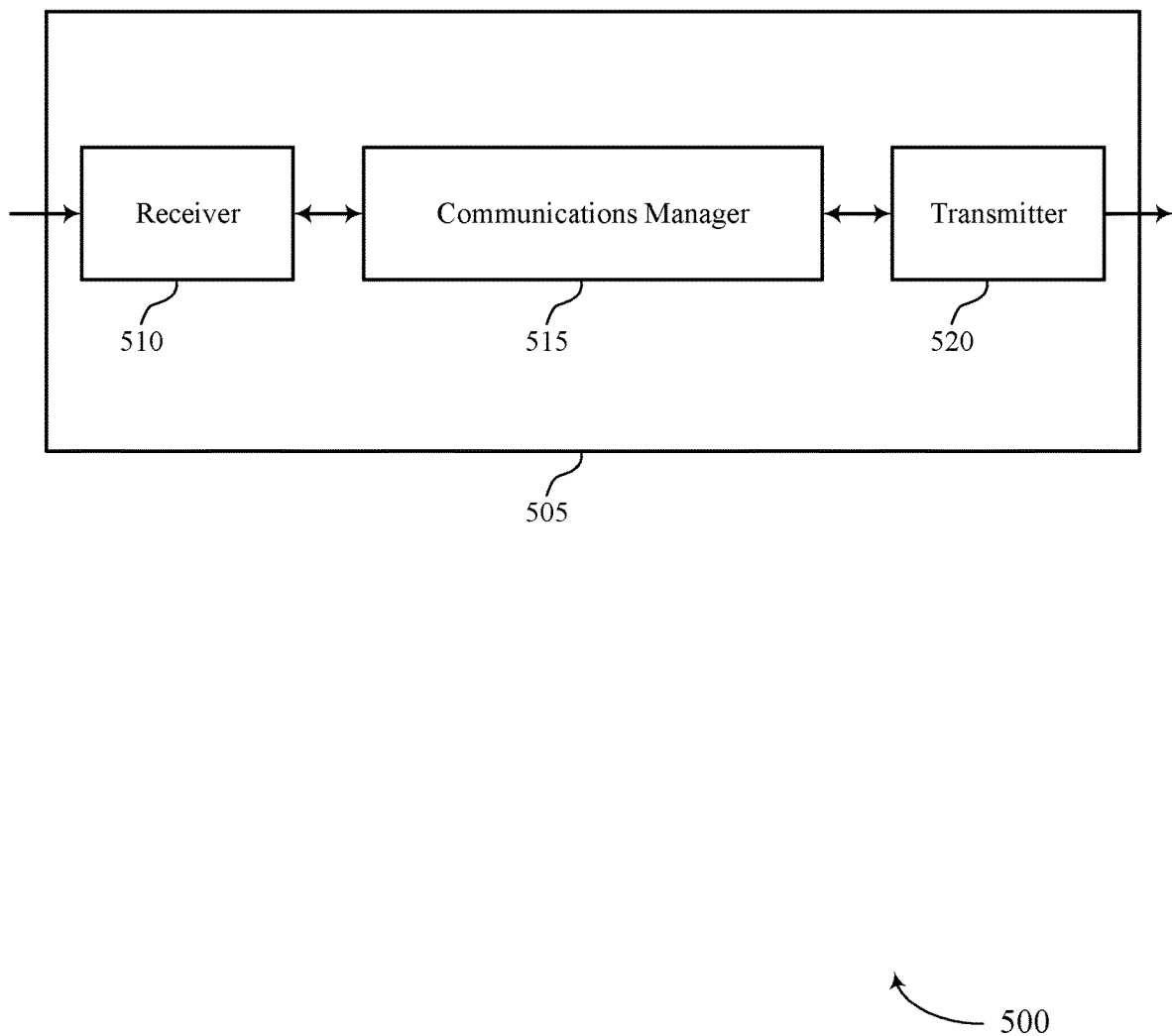
FIGS. 5 and 6 show block diagrams of devices that support measurement reporting for fast fading detection error in accordance with aspects of the present disclosure.

FIG. 5 shows a block diagram 500 of a device 505 that supports measurement reporting for fast fading detection error in accordance with aspects of the present disclosure. The device 505 may be an example of aspects of a UE 115 as described herein. The device 505 may include a receiver 510, an communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to measurement reporting for fast fading detection error, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message, perform the channel measurement procedure using the reference signal resources to identify the set of coherence bandwidth metrics for the multi-band channel, and transmit the feedback message indicating the set of coherence bandwidth metrics. The communications manager 515 may be an example of aspects of the communications manager 810 described herein.

The communications manager 515, or its sub-components, may be implemented in hardware, software (e.g., executed by a processor), or any combination thereof. If implemented in code executed by a processor, the functions of the communications manager 515, or its sub-components may be executed by a general-purpose processor, a digital signal processor (DSP), an application-specific integrated circuit (ASIC), a central processing unit (CPU), a graphics processing unit (GPU), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
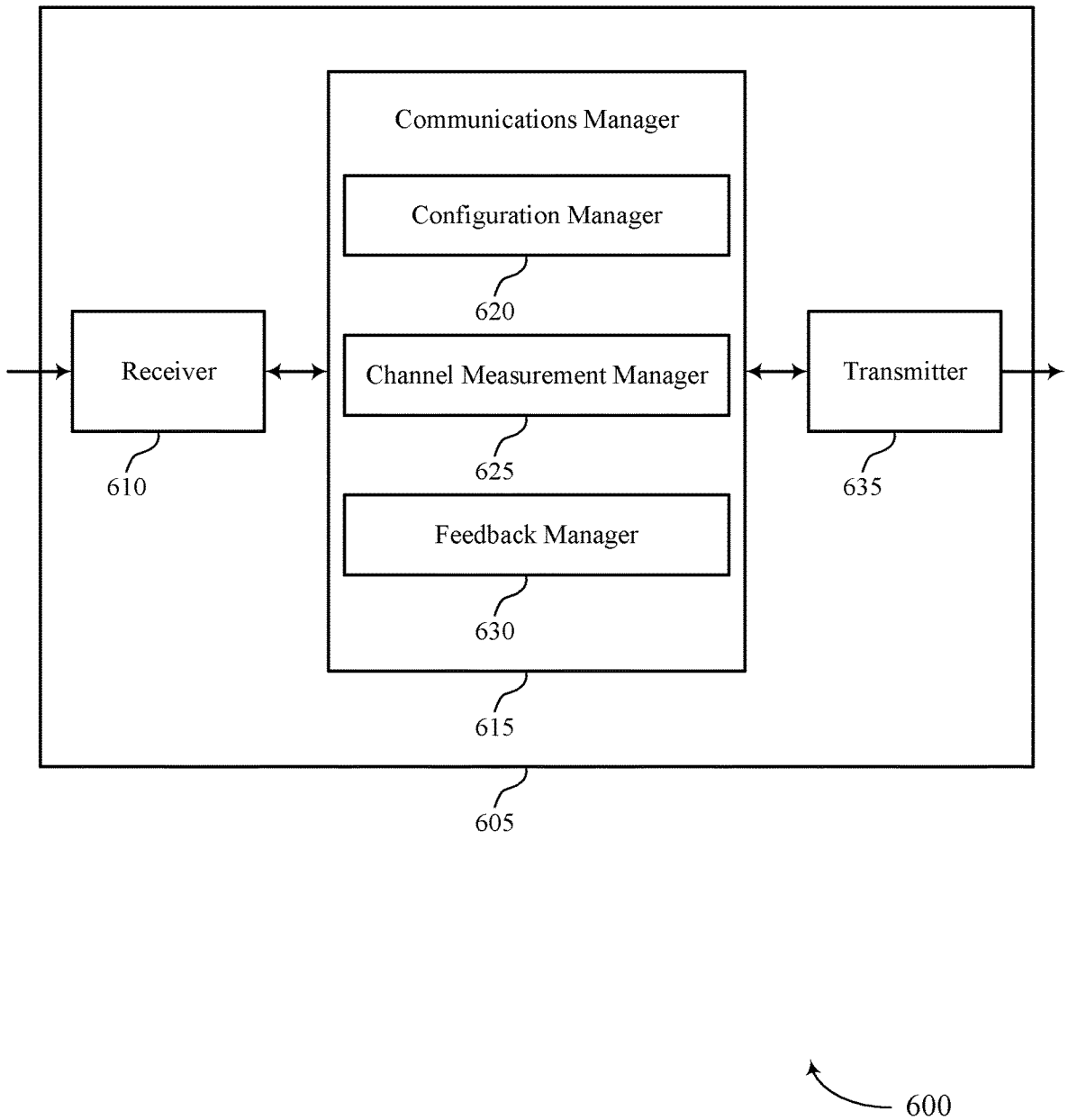

FIG. 6 shows a block diagram 600 of a device 605 that supports measurement reporting for fast fading detection error in accordance with aspects of the present disclosure. The device 605 may be an example of aspects of a device 505, or a UE 115 as described herein. The device 605 may include a receiver 610, an communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to measurement reporting for fast fading detection error, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a channel measurement manager 625, and a feedback manager 630. The communications manager 615 may be an example of aspects of the communications manager 810 described herein.

The configuration manager 620 may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message.

The channel measurement manager 625 may perform the channel measurement procedure using the reference signal resources to identify the set of coherence bandwidth metrics for the multi-band channel.

The feedback manager 630 may transmit the feedback message indicating the set of coherence bandwidth metrics.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
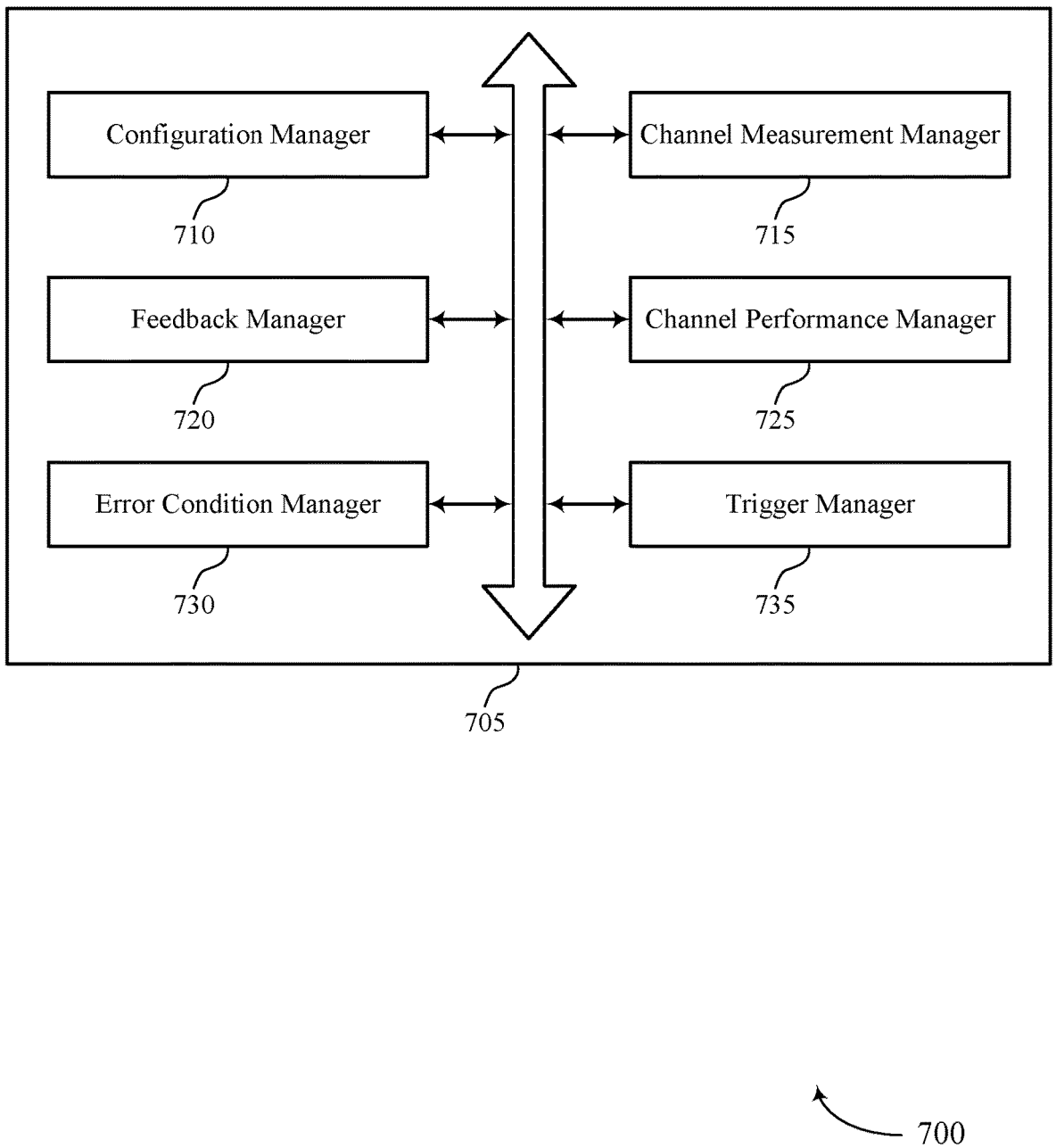
FIG. 7 shows a block diagram of a communications manager that supports measurement reporting for fast fading detection error in accordance with aspects of the present disclosure.

FIG. 7 shows a block diagram 700 of a communications manager 705 that supports measurement reporting for fast fading detection error in accordance with aspects of the present disclosure. The communications manager 705 may be an example of aspects of a communications manager 515, a communications manager 615, or a communications manager 810 described herein. The communications manager 705 may include a configuration manager 710, a channel measurement manager 715, a feedback manager 720, a channel performance manager 725, an error condition manager 730, and a trigger manager 735. Each of these modules may communicate, directly or indirectly, with one another (e.g., via one or more buses).

The configuration manager 710 may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message. In some cases, the configuration signal includes a RRC signal. In some cases, the configuration signal identifying reference signal resources includes a CSI report configuration information element.

The channel measurement manager 715 may perform the channel measurement procedure using the reference signal resources to identify the set of coherence bandwidth metrics for the multi-band channel.

The feedback manager 720 may transmit the feedback message indicating the set of coherence bandwidth metrics.

The channel performance manager 725 may determine a channel performance metric for each band of the multi-band channel, where each band is associated with a resource block group. In some examples, the channel performance manager 725 may determine the coherence bandwidth of the multi-band channel based on a first subset of channel performance metrics corresponding to a first subset of bands of the multi-band channel failing to satisfy a threshold. In some examples, the channel performance manager 725 may determine a non-coherence bandwidth of the multi-band channel based on a second subset of channel performance metrics corresponding to a second subset of bands of the multi-band channel satisfying the threshold.

In some cases, the channel performance metric includes, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

The error condition manager 730 may detect, based on the channel measurement procedure, an error condition for the multi-band channel. In some examples, the error condition manager 730 may determine, based on the set of coherence bandwidth metrics, that the error condition is a fast frequency selective fading error.

The trigger manager 735 may receive a DCI triggering the channel measurement procedure using the reference signal resources, where the channel measurement procedure is performed based on the DCI.

Figure 8:
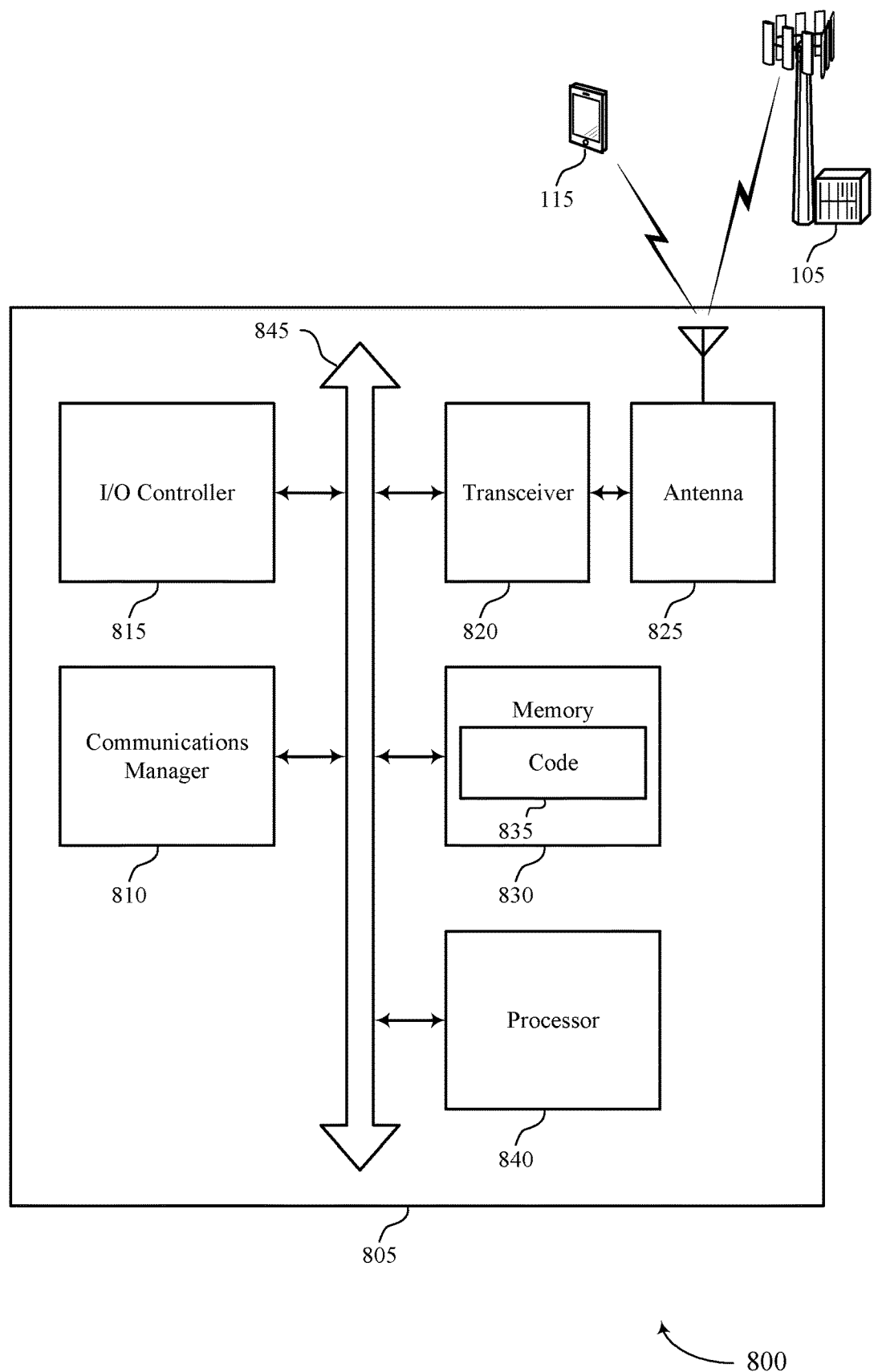
FIG. 8 shows a diagram of a system including a device that supports measurement reporting for fast fading detection error in accordance with aspects of the present disclosure.

FIG. 8 shows a diagram of a system 800 including a device 805 that supports measurement reporting for fast fading detection error in accordance with aspects of the present disclosure. The device 805 may be an example of or include the components of device 505, device 605, or a UE 115 as described herein. The device 805 may include components for bi-directional voice and data communications including components for transmitting and receiving communications, including an communications manager 810, an I/O controller 815, a transceiver 820, an antenna 825, memory 830, and a processor 840. These components may be in electronic communication via one or more buses (e.g., bus 845).

The communications manager 810 may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message, perform the channel measurement procedure using the reference signal resources to identify the set of coherence bandwidth metrics for the multi-band channel, and transmit the feedback message indicating the set of coherence bandwidth metrics.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, a CPU, a GPU, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement reporting for fast fading detection error).

The code 835 may include instructions to implement aspects of the present disclosure, including instructions to support measurement reporting for fast fading detection error. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
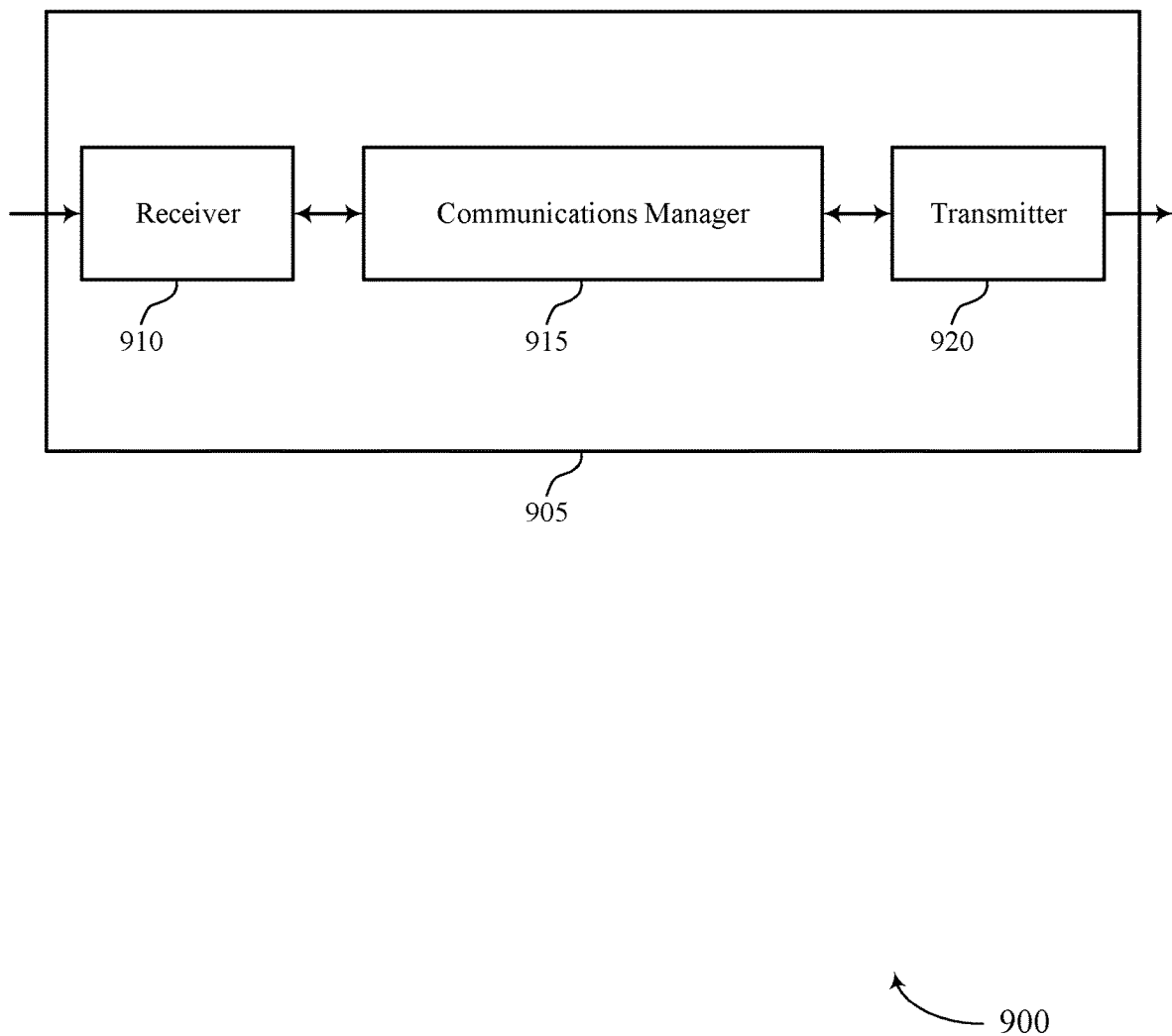
FIGS. 9 and 10 show block diagrams of devices that support measurement reporting for fast fading detection error in accordance with aspects of the present disclosure.

FIG. 9 shows a block diagram 900 of a device 905 that supports measurement reporting for fast fading detection error in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to measurement reporting for fast fading detection error, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify reference signal resources for a channel measurement procedure to be performed by a UE for a multi-band channel, transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message, and receive the feedback message from the UE indicating the set of coherence bandwidth metrics. The communications manager 915 may be an example of aspects of the communications manager 1210 described herein.

The communications manager 915, or its sub-components, may be implemented in hardware, software (e.g., executed by a processor), or any combination thereof. If implemented in code executed by a processor, the functions of the communications manager 915, or its sub-components may be executed by a general-purpose processor, a DSP, an ASIC, a CPU, a GPU, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
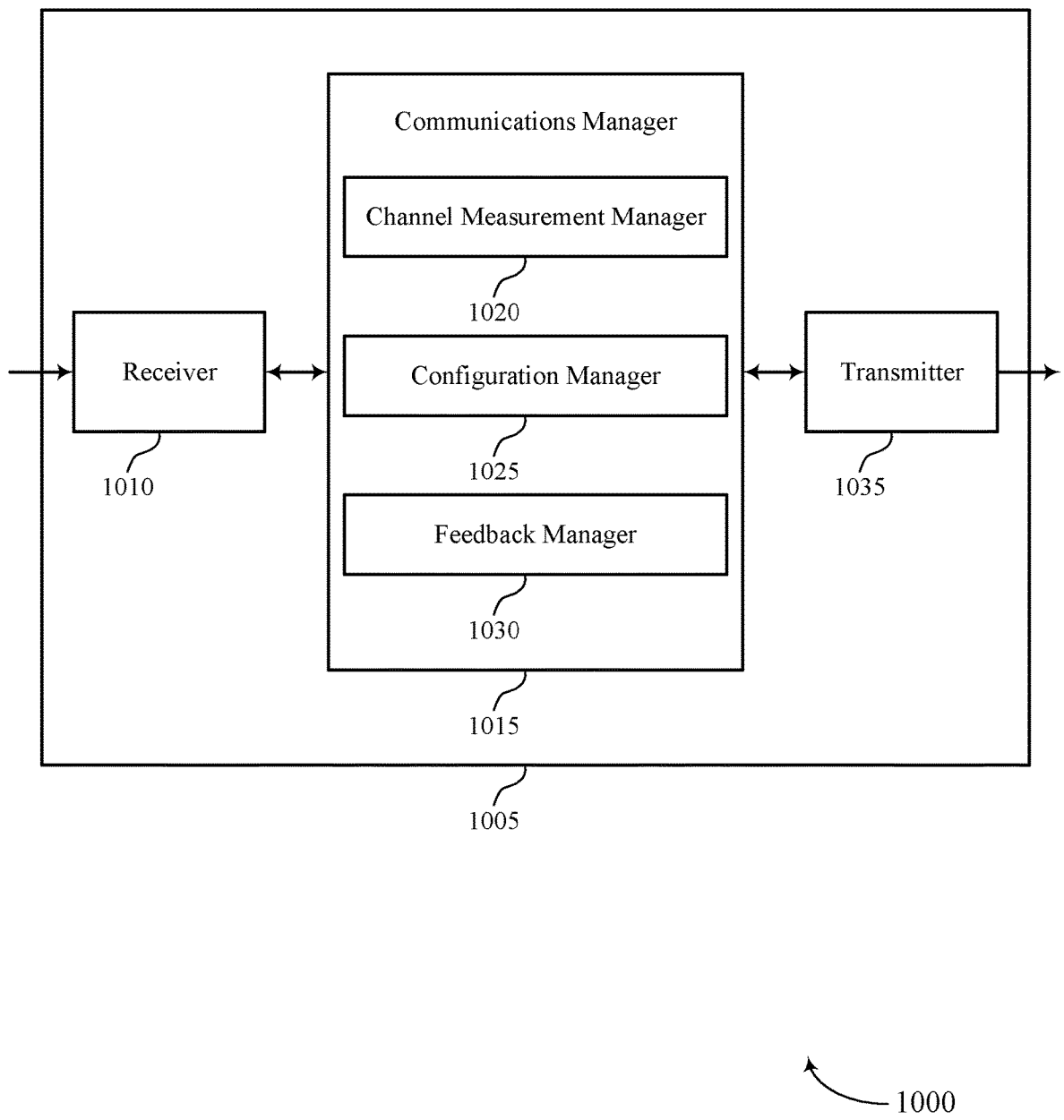

FIG. 10 shows a block diagram 1000 of a device 1005 that supports measurement reporting for fast fading detection error in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement reporting for fast fading detection error, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a channel measurement manager 1020, a configuration manager 1025, and a feedback manager 1030. The communications manager 1015 may be an example of aspects of the communications manager 1210 described herein.

The channel measurement manager 1020 may identify reference signal resources for a channel measurement procedure to be performed by a UE for a multi-band channel.

The configuration manager 1025 may transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message.

The feedback manager 1030 may receive the feedback message from the UE indicating the set of coherence bandwidth metrics.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
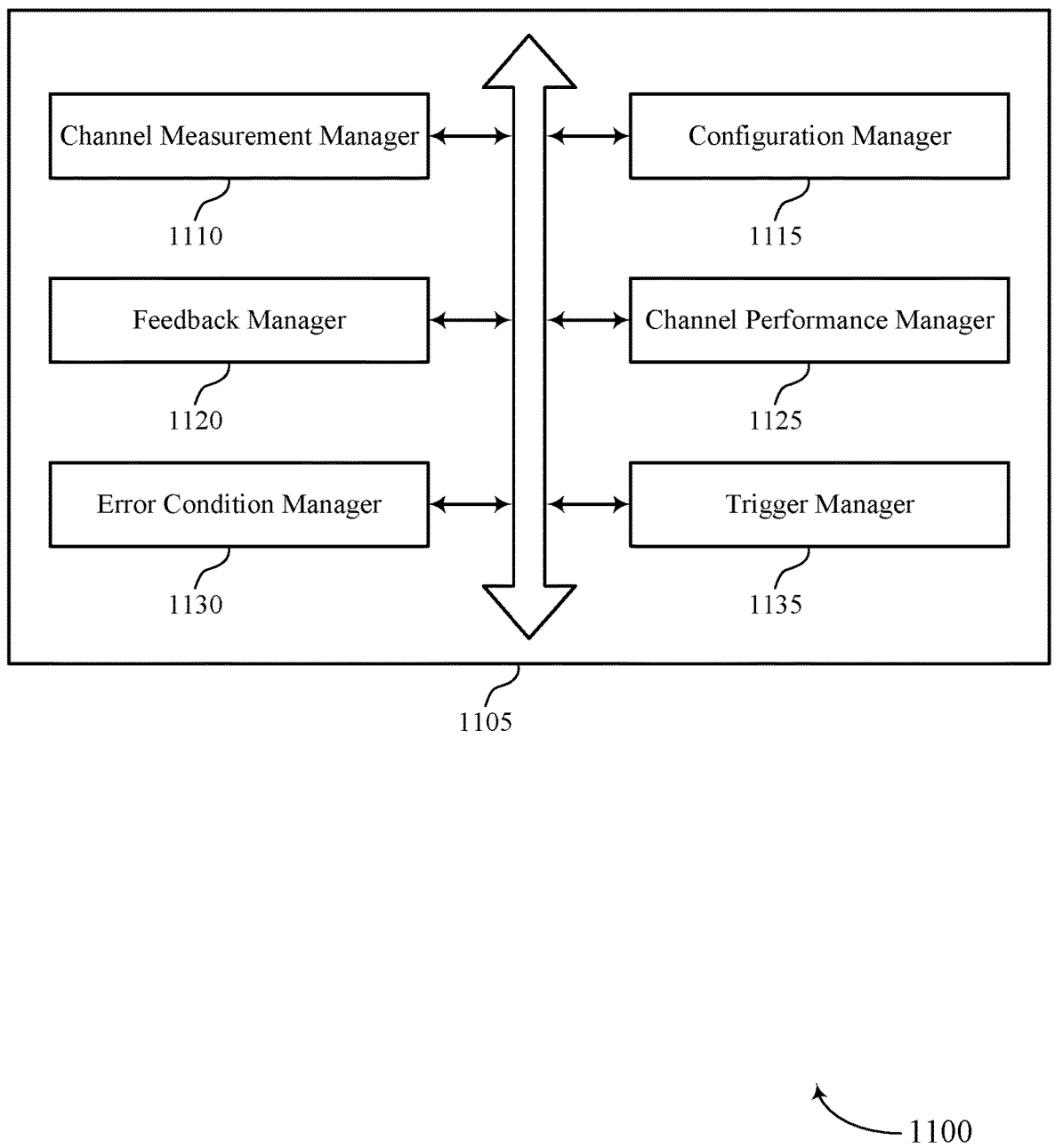
FIG. 11 shows a block diagram of a communications manager that supports measurement reporting for fast fading detection error in accordance with aspects of the present disclosure.

FIG. 11 shows a block diagram 1100 of a communications manager 1105 that supports measurement reporting for fast fading detection error in accordance with aspects of the present disclosure. The communications manager 1105 may be an example of aspects of a communications manager 915, a communications manager 1015, or a communications manager 1210 described herein. The communications manager 1105 may include a channel measurement manager 1110, a configuration manager 1115, a feedback manager 1120, a channel performance manager 1125, an error condition manager 1130, and a trigger manager 1135. Each of these modules may communicate, directly or indirectly, with one another (e.g., via one or more buses).

The channel measurement manager 1110 may identify reference signal resources for a channel measurement procedure to be performed by a UE for a multi-band channel.

The configuration manager 1115 may transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message. In some cases, the configuration signal includes a RRC signal. In some cases, the configuration signal identifying reference signal resources includes a CSI report configuration information element.

The feedback manager 1120 may receive the feedback message from the UE indicating the set of coherence bandwidth metrics.

The channel performance manager 1125 may determine, based on the feedback message, a channel performance metric for each band of the multi-band channel, where each band is associated with a resource block group. In some examples, the channel performance manager 1125 may determine a coherence bandwidth of the multi-band channel based on a first subset of channel performance metrics corresponding to a first subset of bands of the multi-band channel failing to satisfy a threshold. In some examples, the channel performance manager 1125 may determine a non-coherence bandwidth of the multi-band channel based on a second subset of channel performance metrics corresponding to a second subset of bands of the multi-band channel satisfying the threshold.

In some cases, the channel performance metric includes, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

The error condition manager 1130 may detect, based on the feedback message, an error condition for the multi-band channel. In some examples, the error condition manager 1130 may determine, based on the set of coherence bandwidth metrics, that the error condition is a fast frequency selective fading error.

The trigger manager 1135 may transmit a DCI triggering the channel measurement procedure using the reference signal resources, where the feedback message is received based on the DCI.

Figure 12:
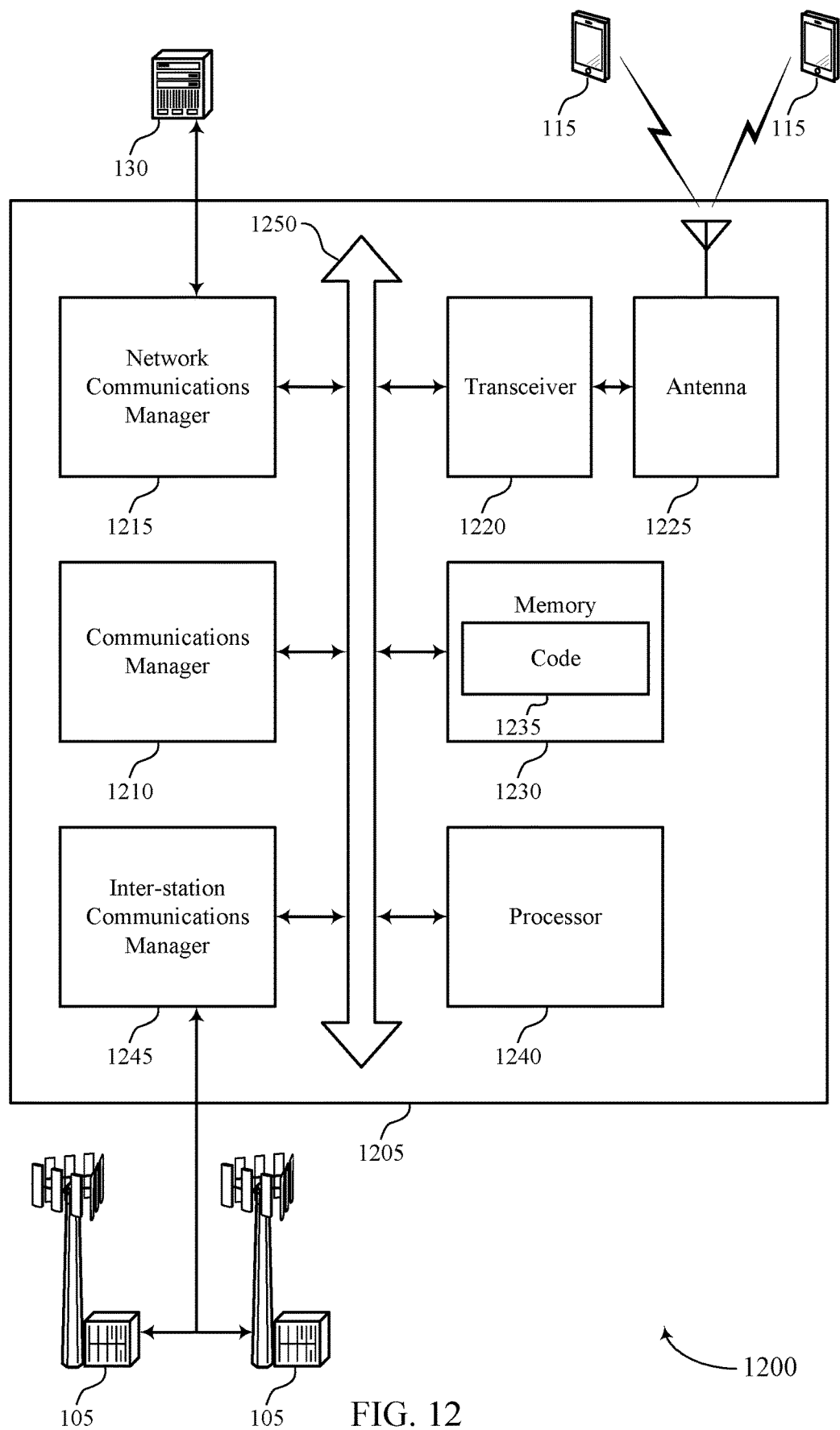
FIG. 12 shows a diagram of a system including a device that supports measurement reporting for fast fading detection error in accordance with aspects of the present disclosure.

FIG. 12 shows a diagram of a system 1200 including a device 1205 that supports measurement reporting for fast fading detection error in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify reference signal resources for a channel measurement procedure to be performed by a UE for a multi-band channel, transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message, and receive the feedback message from the UE indicating the set of coherence bandwidth metrics.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, a CPU, a GPU, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting measurement reporting for fast fading detection error).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support measurement reporting for fast fading detection error. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
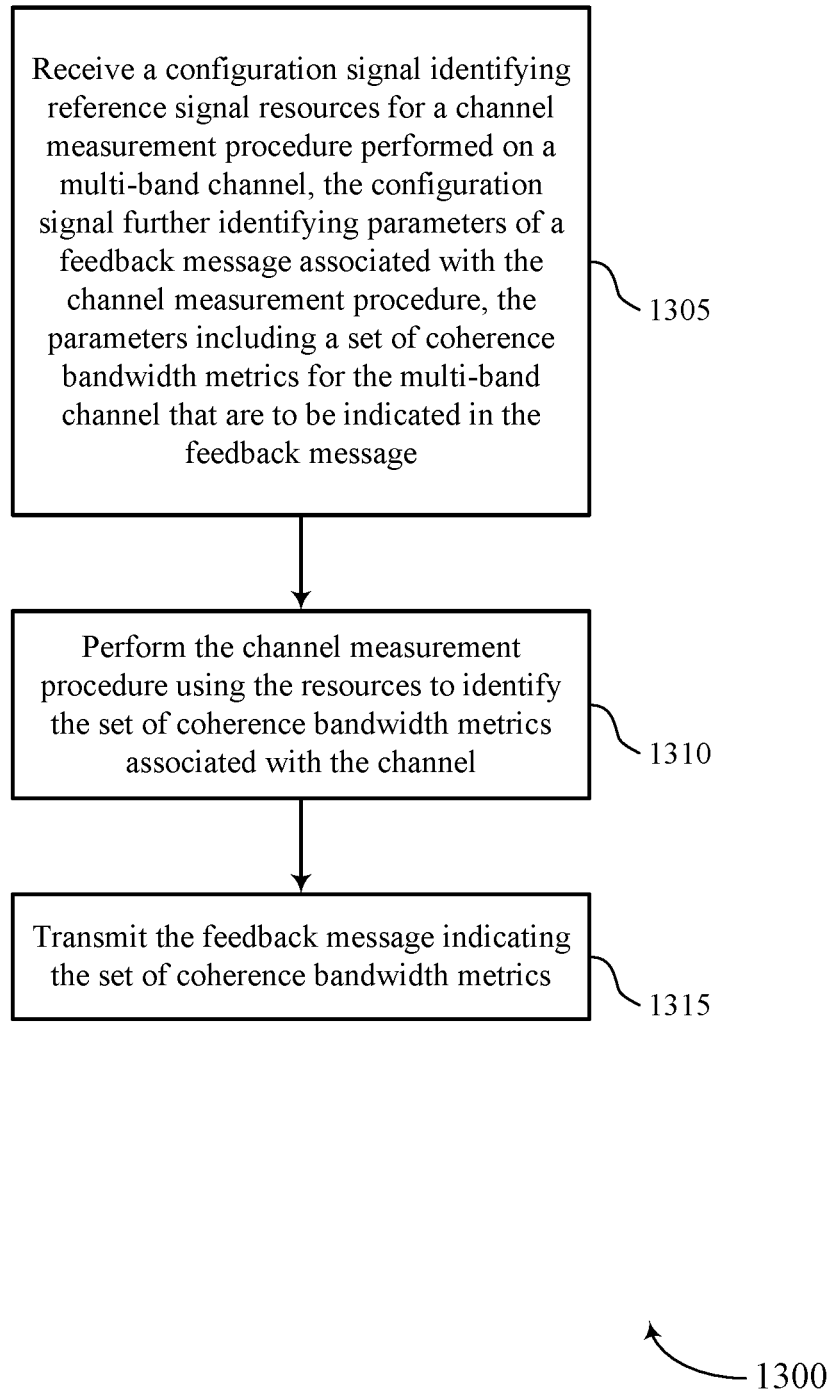
FIGS. 13 through 17 show flowcharts illustrating methods that support measurement reporting for fast fading detection error in accordance with aspects of the present disclosure.

FIG. 13 shows a flowchart illustrating a method 1300 that supports measurement reporting for fast fading detection error in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message. The operations of 1305 may be performed according to the methods described herein. In some examples, aspects of the operations of 1305 may be performed by a configuration manager as described with reference to FIGS. 5 through 8.

At 1310, the UE may perform the channel measurement procedure using the reference signal resources to identify the set of coherence bandwidth metrics for the multi-band channel. The operations of 1310 may be performed according to the methods described herein. In some examples, aspects of the operations of 1310 may be performed by a channel measurement manager as described with reference to FIGS. 5 through 8.

At 1315, the UE may transmit the feedback message indicating the set of coherence bandwidth metrics. The operations of 1315 may be performed according to the methods described herein. In some examples, aspects of the operations of 1315 may be performed by a feedback manager as described with reference to FIGS. 5 through 8.

Figure 14:
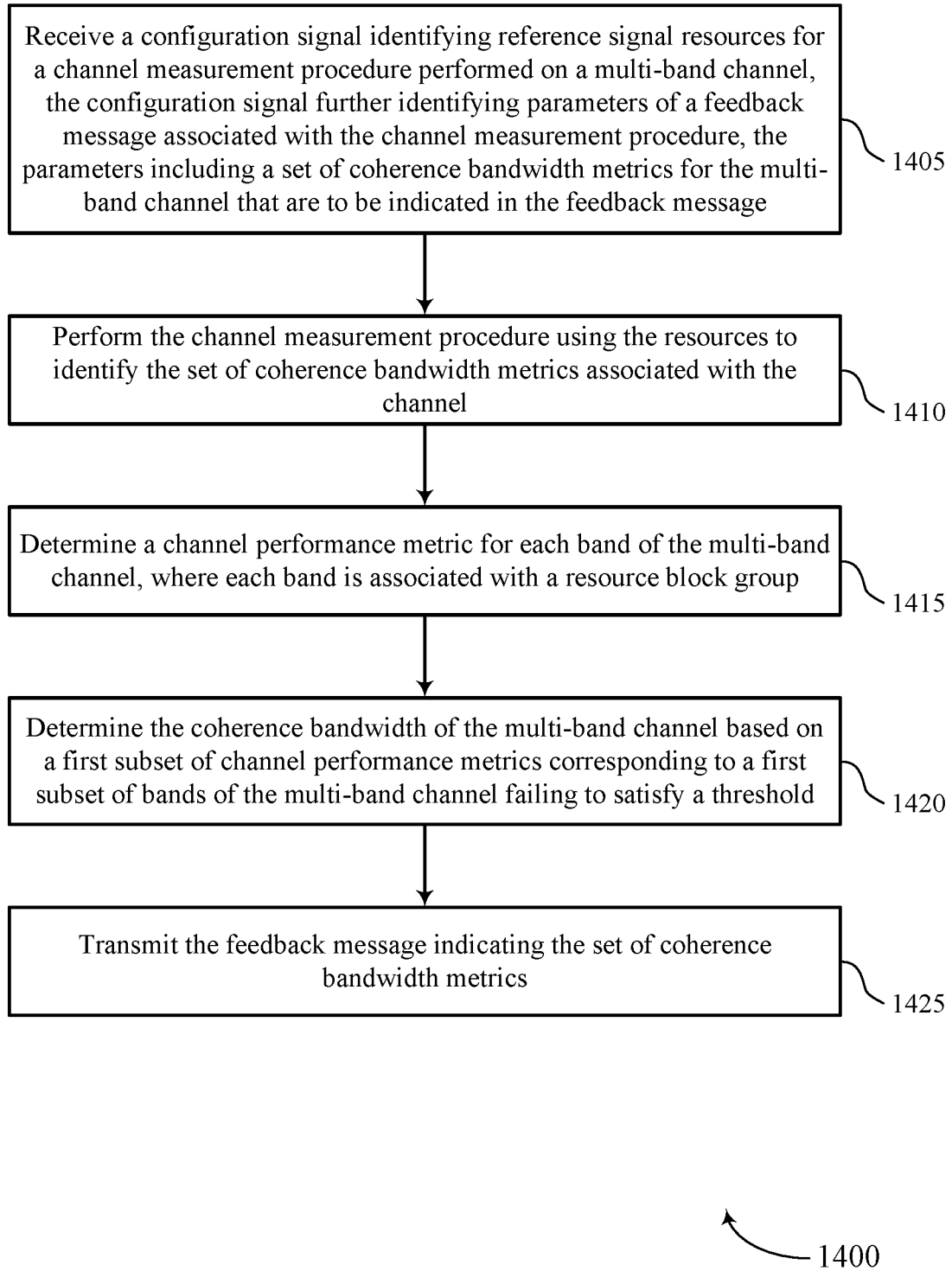

FIG. 14 shows a flowchart illustrating a method 1400 that supports measurement reporting for fast fading detection error in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message. The operations of 1405 may be performed according to the methods described herein. In some examples, aspects of the operations of 1405 may be performed by a configuration manager as described with reference to FIGS. 5 through 8.

At 1410, the UE may perform the channel measurement procedure using the reference signal resources to identify the set of coherence bandwidth metrics for the multi-band channel. The operations of 1410 may be performed according to the methods described herein. In some examples, aspects of the operations of 1410 may be performed by a channel measurement manager as described with reference to FIGS. 5 through 8.

At 1415, the UE may determine a channel performance metric for each band of the multi-band channel, where each band is associated with a resource block group. The operations of 1415 may be performed according to the methods described herein. In some examples, aspects of the operations of 1415 may be performed by a channel performance manager as described with reference to FIGS. 5 through 8.

At 1420, the UE may determine the coherence bandwidth of the multi-band channel based on a first subset of channel performance metrics corresponding to a first subset of bands of the multi-band channel failing to satisfy a threshold. The operations of 1420 may be performed according to the methods described herein. In some examples, aspects of the operations of 1420 may be performed by a channel performance manager as described with reference to FIGS. 5 through 8.

At 1425, the UE may transmit the feedback message indicating the set of coherence bandwidth metrics. The operations of 1425 may be performed according to the methods described herein. In some examples, aspects of the operations of 1425 may be performed by a feedback manager as described with reference to FIGS. 5 through 8.

Figure 15:
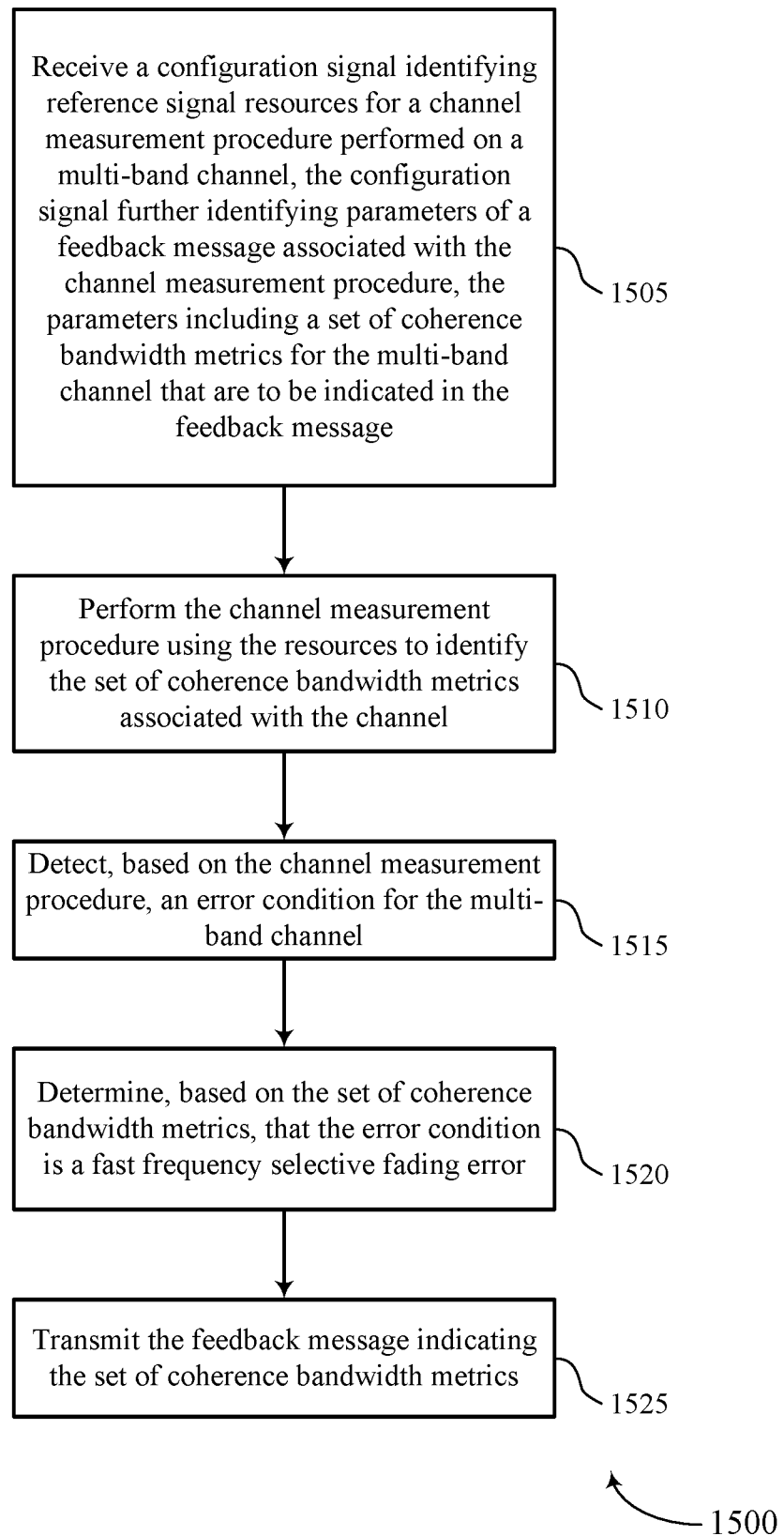

FIG. 15 shows a flowchart illustrating a method 1500 that supports measurement reporting for fast fading detection error in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration signal identifying reference signal resources for a channel measurement procedure performed on a multi-band channel, the configuration signal further identifying parameters of a feedback message associated with the channel measurement procedure, the parameters including a set of coherence bandwidth metrics for the multi-band channel that are to be indicated in the feedback message. The operations of 1505 may be performed according to the methods described herein. In some examples, aspects of the operations of 1505 may be performed by a configuration manager as described with reference to FIGS. 5 through 8.

At 1510, the UE may perform the channel measurement procedure using the reference signal resources to identify the set of coherence bandwidth metrics for the multi-band channel. The operations of 1510 may be performed according to the methods described herein. In some examples, aspects of the operations of 1510 may be performed by a channel measurement manager as described with reference to FIGS. 5 through 8.

At 1515, the UE may detect, based on the channel measurement procedure, an error condition for the multi-band channel. The operations of 1515 may be performed according to the methods described herein. In some examples, aspects of the operations of 1515 may be performed by an error condition manager as described with reference to FIGS. 5 through 8.

At 1520, the UE may determine, based on the set of coherence bandwidth metrics, that the error condition is a fast frequency selective fading error. The operations of 1520 may be performed according to the methods described herein. In some examples, aspects of the operations of 1520 may be performed by an error condition manager as described with reference to FIGS. 5 through 8.

At 1525, the UE may transmit the feedback message indicating the set of coherence bandwidth metrics. The operations of 1525 may be performed according to the methods described herein. In some examples, aspects of the operations of 1525 may be performed by a feedback manager as described with reference to FIGS. 5 through 8.

Figure 16:
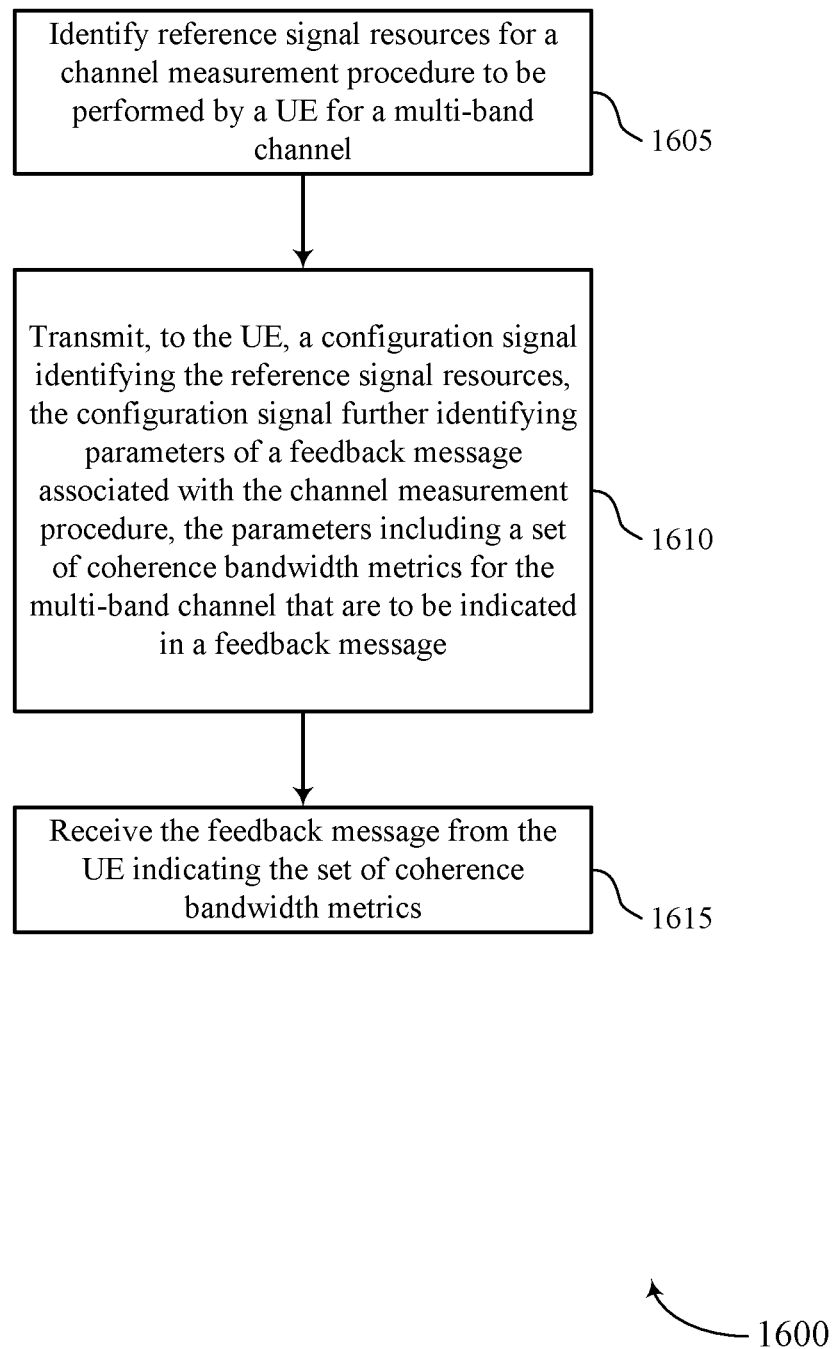

FIG. 16 shows a flowchart illustrating a method 1600 that supports measurement reporting for fast fading detection error in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may identify reference signal resources for a channel measurement procedure to be performed by a UE for a multi-band channel. The operations of 1605 may be performed according to the methods described herein. In some examples, aspects of the operations of 1605 may be performed by a channel measurement manager as described with reference to FIGS. 9 through 12.

At 1610, the base station may transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message. The operations of 1610 may be performed according to the methods described herein. In some examples, aspects of the operations of 1610 may be performed by a configuration manager as described with reference to FIGS. 9 through 12.

At 1615, the base station may receive the feedback message from the UE indicating the set of coherence bandwidth metrics. The operations of 1615 may be performed according to the methods described herein. In some examples, aspects of the operations of 1615 may be performed by a feedback manager as described with reference to FIGS. 9 through 12.

Figure 17:
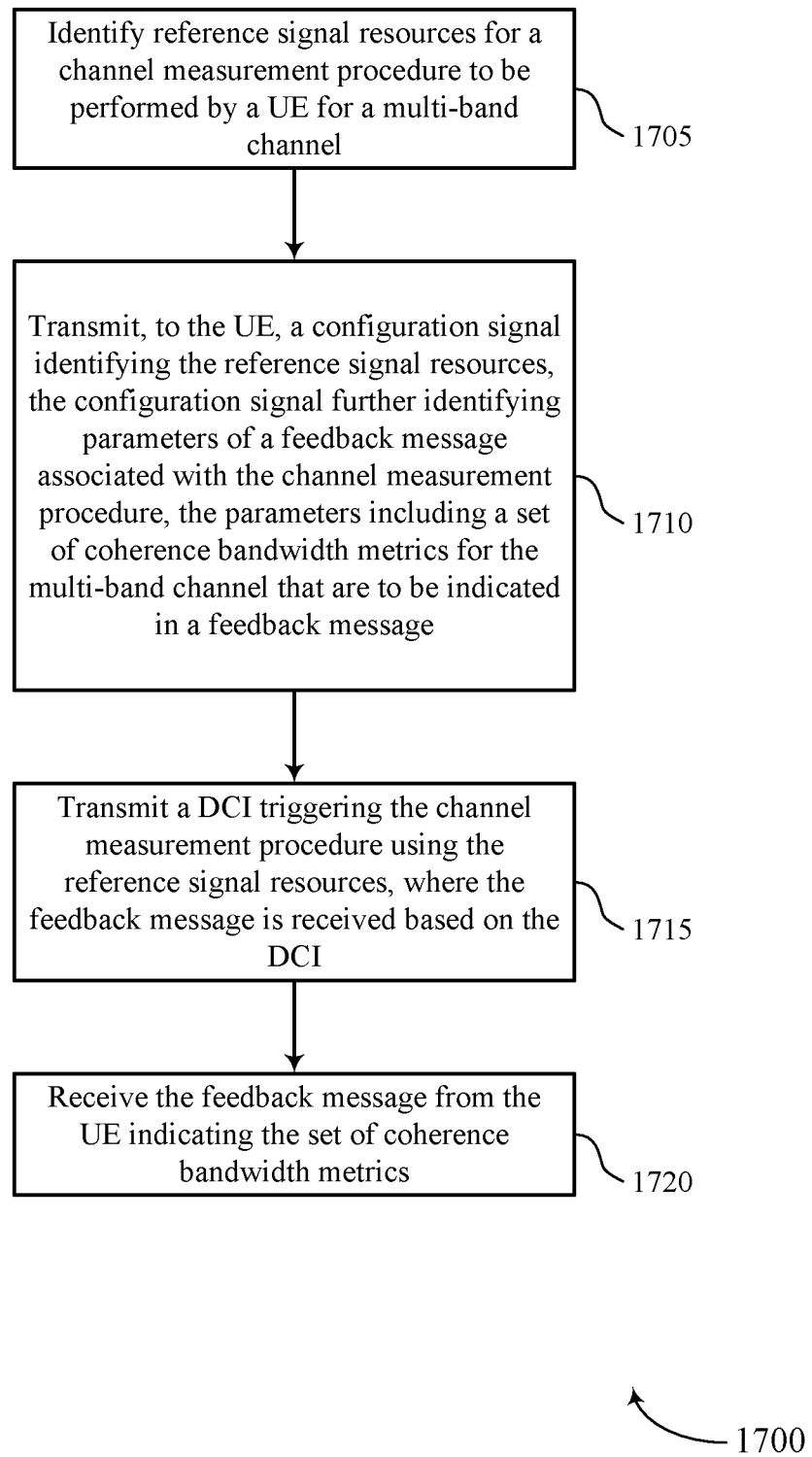

FIG. 17 shows a flowchart illustrating a method 1700 that supports measurement reporting for fast fading detection error in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may identify reference signal resources for a channel measurement procedure to be performed by a UE for a multi-band channel. The operations of 1705 may be performed according to the methods described herein. In some examples, aspects of the operations of 1705 may be performed by a channel measurement manager as described with reference to FIGS. 9 through 12.

At 1710, the base station may transmit, to the UE, a configuration signal identifying the reference signal resources, the configuration signal further identifying parameters of a feedback message associated with the channel measurement procedure, the parameters including a set of coherence bandwidth metrics for the multi-band channel that are to be indicated in a feedback message. The operations of 1710 may be performed according to the methods described herein. In some examples, aspects of the operations of 1710 may be performed by a configuration manager as described with reference to FIGS. 9 through 12.

At 1715, the base station may transmit a DCI triggering the channel measurement procedure using the reference signal resources, where the feedback message is received based on the DCI. The operations of 1715 may be performed according to the methods described herein. In some examples, aspects of the operations of 1715 may be performed by a trigger manager as described with reference to FIGS. 9 through 12.

At 1720, the base station may receive the feedback message from the UE indicating the set of coherence bandwidth metrics. The operations of 1720 may be performed according to the methods described herein. In some examples, aspects of the operations of 1720 may be performed by a feedback manager as described with reference to FIGS. 9 through 12.

The following provides an overview of aspects of the present disclosure:

Aspect 1: A method for wireless communication at a UE, comprising: receiving a configuration signal identifying reference signal resources for a channel measurement procedure performed on a multi-band channel, the configuration signal further identifying parameters of a feedback message associated with the channel measurement procedure, the parameters comprising a set of coherence bandwidth metrics for the multi-band channel that are to be indicated in the feedback message; performing the channel measurement procedure using the reference signal resources to identify the set of coherence bandwidth metrics for the multi-band channel, the set of coherence bandwidth metrics based at least in part on a first subset of channel performance metrics corresponding to a first subset of bands of the multi-band channel failing to satisfy a threshold; and transmitting the feedback message indicating the set of coherence bandwidth metrics.

Aspect 2: The method of aspect 1, further comprising: measuring a channel performance metric for each band of the multi-band channel, wherein each band is associated with a resource block group.

Aspect 3: The method of aspect 2, further comprising: determining a non-coherence bandwidth of the multi-band channel based at least in part on a second subset of channel performance metrics corresponding to a second subset of bands of the multi-band channel satisfying the threshold.

Aspect 4: The method of any of aspects 2 through 3, wherein the channel performance metric comprises, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

Aspect 5: The method of any of aspects 1 through 4, further comprising: detecting, based at least in part on the channel measurement procedure, an error condition for the multi-band channel, wherein the error condition comprises a fast frequency selective fading error based at least in part on the set of coherence bandwidth metrics.

Aspect 6: The method of any of aspects 1 through 5, further comprising: receiving a DCI triggering the channel measurement procedure using the reference signal resources, wherein the channel measurement procedure is performed based at least in part on the DCI.

Aspect 7: The method of any of aspects 1 through 6, wherein the configuration signal comprises an RRC signal.

Aspect 8: The method of any of aspects 1 through 7, wherein the configuration signal identifying reference signal resources comprises a CSI report configuration information element.

Aspect 9: A method for wireless communication at a network device, comprising: selecting reference signal resources for a channel measurement procedure to be performed by a UE for a multi-band channel; transmitting, to the UE, a configuration signal identifying the reference signal resources, the configuration signal further identifying parameters of a feedback message associated with the channel measurement procedure, the parameters comprising a set of coherence bandwidth metrics for the multi-band channel that are to be indicated in a feedback message, the set of coherence bandwidth metrics based at least in part on a first subset of channel performance metrics corresponding to a first subset of bands of the multi-band channel failing to satisfy a threshold; and receiving the feedback message from the UE indicating the set of coherence bandwidth metrics.

Aspect 10: The method of aspect 9, further comprising: decoding the feedback message to determine a channel performance metric for each band of the multi-band channel, wherein each band is associated with a resource block group.

Aspect 11: The method of aspect 10, further comprising: determining a non-coherence bandwidth of the multi-band channel based at least in part on a second subset of channel performance metrics corresponding to a second subset of bands of the multi-band channel satisfying the threshold.

Aspect 12: The method of any of aspects 10 through 11, wherein the channel performance metric comprises, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

Aspect 13: The method of any of aspects 9 through 12, further comprising: detecting, based at least in part on the feedback message, an error condition for the multi-band channel, wherein the error condition comprises a fast frequency selective fading error based at least in part on the set of coherence bandwidth metrics.

Aspect 14: The method of any of aspects 9 through 13, further comprising: transmitting a DCI triggering the channel measurement procedure using the reference signal resources, wherein the feedback message is received based at least in part on the DCI.

Aspect 15: The method of any of aspects 9 through 14, wherein the configuration signal comprises an RRC signal.

Aspect 16: The method of any of aspects 9 through 15, wherein the configuration signal identifying reference signal resources comprises a CSI report configuration information element.

Aspect 17: An apparatus for wireless communication at a UE, comprising a processor; memory coupled with the processor; and instructions stored in the memory and executable by the processor to cause the apparatus to perform a method of any of aspects 1 through 8.

Aspect 18: An apparatus for wireless communication at a UE, comprising at least one means for performing a method of any of aspects 1 through 8.

Aspect 19: A non-transitory computer-readable medium storing code for wireless communication at a UE, the code comprising instructions executable by a processor to perform a method of any of aspects 1 through 8.

Aspect 20: An apparatus for wireless communication at a network device, comprising a processor; memory coupled with the processor; and instructions stored in the memory and executable by the processor to cause the apparatus to perform a method of any of aspects 9 through 16.

Aspect 21: An apparatus for wireless communication at a network device, comprising at least one means for performing a method of any of aspects 9 through 16.

Aspect 22: A non-transitory computer-readable medium storing code for wireless communication at a network device, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    at least one processor; and
    memory coupled with the at least one processor, the memory storing instructions executable by the at least one processor to cause the UE to:
    receive a configuration signal identifying reference signal resources for a channel measurement procedure performed on a multi-band channel, the configuration signal further identifying parameters of a feedback message associated with the channel measurement procedure, the parameters comprising a set of coherence bandwidth metrics for the multi-band channel that are to be indicated in the feedback message;
    perform the channel measurement procedure using the reference signal resources to identify the set of coherence bandwidth metrics for the multi-band channel, the set of coherence bandwidth metrics based at least in part on a first subset of channel performance metrics corresponding to a first subset of bands of the multi-band channel failing to satisfy a threshold; and
    transmit the feedback message indicating the set of coherence bandwidth metrics.

2. The apparatus of claim 1, wherein the instructions are further executable by the at least one processor to cause the UE to:
    measure a channel performance metric for each band of the multi-band channel, wherein each band is associated with a resource block group.

3. The apparatus of claim 2, wherein the instructions are further executable by the at least one processor to cause the UE to:
    determine a non-coherence bandwidth of the multi-band channel based at least in part on a second subset of channel performance metrics corresponding to a second subset of bands of the multi-band channel satisfying the threshold.

4. The apparatus of claim 2, wherein the channel performance metric comprises, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

5. The apparatus of claim 1, wherein the instructions are further executable by the at least one processor to cause the UE to:
    detect, based at least in part on the channel measurement procedure, an error condition for the multi-band channel, wherein the error condition comprises a fast frequency selective fading error based at least in part on the set of coherence bandwidth metrics.

6. The apparatus of claim 1, wherein the instructions are further executable by the at least one processor to cause the UE to:
    receive a downlink control information (DCI) triggering the channel measurement procedure using the reference signal resources, wherein the channel measurement procedure is performed based at least in part on the DCI.

7. The apparatus of claim 1, wherein the configuration signal comprises a radio resource control (RRC) signal.

8. The apparatus of claim 1, wherein the configuration signal identifying reference signal resources comprises a channel state information (CSI) report configuration information element.

9. An apparatus for wireless communication at a network device, comprising:
- at least one processor; and
- memory coupled with the at least one processor, the memory storing instructions executable by the at least one processor to cause the network device to:
- select reference signal resources for a channel measurement procedure to be performed by a user equipment (UE) for a multi-band channel;
- transmit, to the UE, a configuration signal identifying the reference signal resources, the configuration signal further identifying parameters of a feedback message associated with the channel measurement procedure, the parameters comprising a set of coherence bandwidth metrics for the multi-band channel that are to be indicated in a feedback message, the set of coherence bandwidth metrics based at least in part on a first subset of channel performance metrics corresponding to a first subset of bands of the multi-band channel failing to satisfy a threshold; and
- receive the feedback message from the UE indicating the set of coherence bandwidth metrics.

10. The apparatus of claim 9, wherein the instructions are further executable by the at least one processor to cause the network device to:
- decode the feedback message to determine a channel performance metric for each band of the multi-band channel, wherein each band is associated with a resource block group.

11. The apparatus of claim 10, wherein the instructions are further executable by the at least one processor to cause the network device to:
- determine a non-coherence bandwidth of the multi-band channel based at least in part on a second subset of channel performance metrics corresponding to a second subset of bands of the multi-band channel satisfying the threshold.

12. The apparatus of claim 10, wherein the channel performance metric comprises, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

13. The apparatus of claim 9, wherein the instructions are further executable by the at least one processor to cause the network device to:
- detect, based at least in part on the feedback message, an error condition for the multi-band channel, wherein the error condition comprises a fast frequency selective fading error based at least in part on the set of coherence bandwidth metrics.

14. The apparatus of claim 9, wherein the instructions are further executable by the at least one processor to cause the network device to:
- transmit a downlink control information (DCI) triggering the channel measurement procedure using the reference signal resources, wherein the feedback message is received based at least in part on the DCI.

15. The apparatus of claim 9, wherein the configuration signal comprises a radio resource control (RRC) signal.

16. The apparatus of claim 9, wherein the configuration signal identifying reference signal resources comprises a channel state information (CSI) report configuration information element.

17. A method for wireless communication at a user equipment (UE), comprising:
- receiving a configuration signal identifying reference signal resources for a channel measurement procedure performed on a multi-band channel, the configuration signal further identifying parameters of a feedback message associated with the channel measurement procedure, the parameters comprising a set of coherence bandwidth metrics for the multi-band channel that are to be indicated in the feedback message;
- performing the channel measurement procedure using the reference signal resources to identify the set of coherence bandwidth metrics for the multi-band channel, the set of coherence bandwidth metrics based at least in part on a first subset of channel performance metrics corresponding to a first subset of bands of the multi-band channel failing to satisfy a threshold; and
- transmitting the feedback message indicating the set of coherence bandwidth metrics.

18. The method of claim 17, further comprising:
- measuring a channel performance metric for each band of the multi-band channel, wherein each band is associated with a resource block group.

19. The method of claim 18, further comprising:
- determining a non-coherence bandwidth of the multi-band channel based at least in part on a second subset of channel performance metrics corresponding to a second subset of bands of the multi-band channel satisfying the threshold.

20. The method of claim 18, wherein the channel performance metric comprises, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

21. The method of claim 17, further comprising:
- detecting, based at least in part on the channel measurement procedure, an error condition for the multi-band channel, wherein the error condition comprises a fast frequency selective fading error based at least in part on the set of coherence bandwidth metrics.

22. The method of claim 17, further comprising:
- receiving a downlink control information (DCI) triggering the channel measurement procedure using the reference signal resources, wherein the channel measurement procedure is performed based at least in part on the DCI.

23. The method of claim 17, wherein the configuration signal comprises a radio resource control (RRC) signal.

24. The method of claim 17, wherein the configuration signal identifying reference signal resources comprises a channel state information (CSI) report configuration information element.

25. A method for wireless communication at a network device, comprising:
- selecting reference signal resources for a channel measurement procedure to be performed by a user equipment (UE) for a multi-band channel;
- transmitting, to the UE, a configuration signal identifying the reference signal resources, the configuration signal further identifying parameters of a feedback message associated with the channel measurement procedure, the parameters comprising a set of coherence bandwidth metrics for the multi-band channel that are to be indicated in a feedback message, the set of coherence bandwidth metrics based at least in part on a first subset of channel performance metrics corresponding to a first subset of bands of the multi-band channel failing to satisfy a threshold; and
- receiving the feedback message from the UE indicating the set of coherence bandwidth metrics.

26. The method of claim 25, further comprising:
- decoding the feedback message to determine a channel performance metric for each band of the multi-band channel, wherein each band is associated with a resource block group.

27. The method of claim 26, further comprising:
- determining a non-coherence bandwidth of the multi-band channel based at least in part on a second subset of channel performance metrics corresponding to a second subset of bands of the multi-band channel satisfying the threshold.

28. The method of claim 26, wherein the channel performance metric comprises, at least one of a first interference-to-noise level for the first subset of bands, a received power level for the first subset of bands, a second received power level for a second subset of bands having corresponding channel performance metrics satisfying the threshold, an instantaneous received interference averaged across the first subset of bands, a difference between an instantaneous and a maximum received power level across all bands in the multi-band channel, a change in an instantaneous received power level greater than a change threshold, or a combination thereof.

29. The method of claim 25, further comprising:
- detecting, based at least in part on the feedback message, an error condition for the multi-band channel, wherein the error condition comprises a fast frequency selective fading error based at least in part on the set of coherence bandwidth metrics.

30. The method of claim 25, further comprising:
- transmitting a downlink control information (DCI) triggering the channel measurement procedure using the reference signal resources, wherein the feedback message is received based at least in part on the DCI.

* * * * *